United States Patent
Worm et al.

(10) Patent No.: US 6,982,007 B2
(45) Date of Patent: Jan. 3, 2006

(54) DIVIDED PRESSURE VESSEL APPARATUS FOR CARBON DIOXIDE BASED SYSTEMS AND METHODS OF USING SAME

(75) Inventors: Steven L. Worm, Raleigh, NC (US); James P. DeYoung, Durham, NC (US); James B. McClain, Raleigh, NC (US); David E. Brainard, Wake Forest, NC (US)

(73) Assignee: Micell Technologies, Raleigh, NC (US)

( * ) Notice: Subject to any disclaimer, the term of this patent is extended or adjusted under 35 U.S.C. 154(b) by 72 days.

(21) Appl. No.: 10/695,544

(22) Filed: Oct. 29, 2003

(65) Prior Publication Data
US 2004/0102042 A1    May 27, 2004

Related U.S. Application Data

(62) Division of application No. 09/976,551, filed on Oct. 12, 2001, now Pat. No. 6,734,112.

(60) Provisional application No. 60/240,473, filed on Oct. 13, 2000.

(51) Int. Cl.
  *B08B 3/08* (2006.01)
  *D06F 43/00* (2006.01)
  *H01L 21/302* (2006.01)

(52) U.S. Cl. .............................. 134/11; 134/34; 8/142; 8/158; 438/689

(58) Field of Classification Search .................... 8/142, 8/149.1, 149.2, 158; 134/11, 12, 34, 902

See application file for complete search history.

(56) References Cited

U.S. PATENT DOCUMENTS 3,852,192 A    12/1974  Fassell et al. ................ 210/761

(Continued)

FOREIGN PATENT DOCUMENTS

EP    1 055 766 A1    11/2000

(Continued)

OTHER PUBLICATIONS

Jerome C. Barton, "The Los Alamos Super Scrub™: Supercritical Carbon Dioxide System Utilities and Consumables Study," *Los Alamos, N.M.: Los Alamos National Laboratory*, LA-12786: 9 p. (1994).

(Continued)

*Primary Examiner*—Joseph L. Perrin
(74) *Attorney, Agent, or Firm*—Myers Bigel Sibley & Sajovec, P.A.

(57) ABSTRACT

A method of utilizing a divided pressure vessel in a processing system employing a carbon dioxide based solvent includes transferring a first carbon dioxide based treating solution from a first liquid chamber in a divided pressure vessel having a plurality of liquid chambers to a processing vessel, returning the first treating solution from the processing vessel to the divided pressure vessel, transferring a second carbon dioxide based treating solution having a composition different from the first treating solution from a second liquid chamber in the divided pressure vessel to a processing vessel, and returning the second treating solution from the processing vessel to the divided pressure vessel. A divided pressure vessel may allow multiple solvent baths each having a different chemical composition to be stored and/or processed in a single pressure vessel while maintaining the different chemical compositions of the multiple solvent baths. Thus, such divided pressure vessels may provide the improved operational efficiency of a carbon dioxide based system having multiple solvent baths while decreasing the capital costs that may be associated with such systems.

30 Claims, 8 Drawing Sheets

U.S. PATENT DOCUMENTS

| | | | |
|---|---|---|---|
| 3,961,908 A | 6/1976 | Touro | 422/269 |
| 4,406,742 A | 9/1983 | Dick | 196/14.52 |
| 4,895,176 A | 1/1990 | Ohtsuka et al. | |
| 5,018,551 A | 5/1991 | Pelissier | |
| 5,267,455 A | 12/1993 | Dewees et al. | |
| 5,586,456 A | 12/1996 | Takagawa et al. | |
| 5,789,505 A * | 8/1998 | Wilkinson et al. | 526/209 |
| 5,858,022 A | 1/1999 | Romack et al. | |
| 5,904,737 A * | 5/1999 | Preston et al. | 8/158 |
| 5,922,247 A | 7/1999 | Shoham et al. | 261/78.2 |
| 6,200,943 B1 | 3/2001 | Romack et al. | |
| 6,212,916 B1 * | 4/2001 | Carr | 68/18 R |
| 6,216,302 B1 * | 4/2001 | Preston et al. | 8/158 |
| 6,260,390 B1 * | 7/2001 | Carr | 68/18 R |
| 6,442,980 B2 * | 9/2002 | Preston et al. | 134/107 |
| 6,776,801 B2 * | 8/2004 | Berglund | 8/142 |
| 6,851,148 B2 * | 2/2005 | Preston et al. | 8/158 |

FOREIGN PATENT DOCUMENTS

| | | |
|---|---|---|
| FR | 2 291 447 | 6/1996 |
| WO | WO 97/33031 | 9/1997 |
| WO | WO 00/01871 | 1/2000 |

OTHER PUBLICATIONS

Spall et al., "Precision Cleaning with Supercritical Carbon Dioxide for the Elimination of Organic Solvents and the Reduction of Hazardous Waste," *Los Alamos, N.M.: Los Alamos National Laboratory*, LA-UR-94-3136: 16 p. (1994).

Williams et al., "Fabric Compatibility and Cleaning Effectiveness of Drycleaning with Carbon Dioxide," *Los Alamos, N.M.: Los Alamos National Laboratory*, LA-UR-96-822: 30 p. (1996).

Williams et al., "Elimination of Solvents and Waste by Supercritical Carbon Dioxide in Precision Cleaning," *Los Alamos, N.M.: Los Alamos National Laboratory*, LA-UR-94-3313: 23 p. (1994).

International Search Report corresponding to PCT/US01/31507; Date of Mailing: May 27, 2002.

US 6,001,133, 12/1999, DeYoung et al. (withdrawn)

\* cited by examiner

DIVIDED PRESSURE VESSEL APPARATUS FOR CARBON DIOXIDE BASED SYSTEMS AND METHODS OF USING SAME

RELATED APPLICATIONS

This application is a divisional of and claims priority from U.S. patent application Ser. No. 09/976,551, filed Oct. 12, 2001 now U.S. Pat. No. 6,734,112, which claims the benefit of U.S. Provisional Patent Application No. 60/240,473, filed Oct. 13, 2000, the disclosures of which are incorporated herein by reference in their entirety.

FIELD OF THE INVENTION

This invention relates to densified gas based systems, more particularly to divided pressure vessel apparatus for carbon dioxide based systems and methods of using same.

BACKGROUND OF THE INVENTION

An important operational consideration for many, if not all, carbon dioxide processing systems is throughput, which may be defined as the amount of articles or materials that may be processed in a given period of time. In various processes that utilize carbon dioxide as a solvent, multiple solvent baths may be used to improve operational efficiency by increasing throughput. For example, in a carbon dioxide based dry cleaning system, it may be desirable to provide pre-washing, washing, rinsing, and distillation operations. The pre-wash, wash, and rinse solutions may each have a different chemical composition. If a single tank were used to store the various baths, the composition of the solution in the tank would need to be adjusted between each operation, which may increase cycle time and decrease throughput. By utilizing a tank for storing a pre-wash solution, a separate tank for storing wash solution, another separate tank for storing a rinse solution, and yet another separate distillation tank, the dry cleaning system may be able to cycle through the operations of pre-washing, washing, rinsing, and distillation in a more timely manner.

U.S. Pat. No. 5,267,455 to Dewees et al. proposes a dry cleaning system particularly suited for employing supercritical carbon dioxide as the cleaning fluid consisting of a sealable cleaning vessel containing a rotatable drum adapted for holding soiled substrate, a cleaning fluid storage vessel, and a separate gas vaporizer vessel for recycling used cleaning fluid.

While utilizing multiple solvent baths in carbon dioxide based systems may improve operational efficiency, the increased capital costs associated with such systems may outweigh some of the operational benefits. Carbon dioxide based systems may be required to operate at elevated pressures in order to maintain the carbon dioxide solvent in either a liquid or a supercritical state. As a result, each of the separate tanks must be a stamp coded and certified pressure vessel, which can be quite expensive. Additionally, each of the separate tanks must be in constant fluid communication with a pressure relief valve. Thus, the capital cost of constructing a carbon dioxide based system having multiple solvent baths may outweigh some, if not all, of the operational benefits that may be gained by utilizing such a system.

WO 97/33031 proposes a storage/still vessel that both distills and stores the liquid gas for use in another cleaning cycle. The storage/still vessel includes a tube located within an inner cavity of an outer tank. At the top of the tube is an opening that provides fluid communication between the inner cavity and an inner chamber of the tube. The bottom of the tube has a one-way control valve that allows the liquid gas to flow from the inner cavity to the inner chamber. The vessel has a heating element that can heat and vaporize the liquid gas within the inner chamber of the tube. The still vaporizes the liquid gas within the tube, which causes liquid to flow from the inner cavity to the inner chamber. Vaporized liquid gas condenses and falls into the inner cavity, which then forms a layer of distilled "clean" liquid, on top of a layer of undistilled "dirty" liquid. The cycle is continued until the level of dirty liquid falls below the one way control valve.

WO 97/33031 does not provide an apparatus utilizing a carbon dioxide based solvent that will allow two or more fluids having different chemical compositions to be stored and/or processed within the same pressure vessel while maintaining the different chemical compositions of the two or more fluids.

SUMMARY OF THE INVENTION

According to the present invention, divided pressure vessels for use in a carbon dioxide based system are provided. Divided pressure vessels of the present invention may allow multiple solvent baths each having a different chemical composition to be stored and/or processed in a single pressure vessel while maintaining the different chemical compositions of the multiple solvent baths. Thus, divided pressure vessels of the present invention may provide the improved operational efficiency of a carbon dioxide based system having multiple solvent baths while decreasing the capital costs that may be associated with such systems. Methods of utilizing such divided pressure vessels in processing systems employing carbon dioxide based solvents are also be provided.

According to the present invention, methods of utilizing a divided storage vessel include transferring a first densified gas based treating solution from a first liquid chamber in a divided storage vessel having a plurality of liquid chambers to a processing vessel, returning the first treating solution from the processing vessel to the divided storage vessel, transferring a second carbon dioxide based treating solution having a composition different from the first treating solution from a second liquid chamber in the divided storage vessel to a processing vessel, and returning the second treating solution from the processing vessel to the divided storage vessel. The processing system may be a batch processing system, a semi-batch processing system, or a continuous processing system.

In embodiments of the present invention, the methods of utilizing a divided storage vessel include contacting an article in the processing vessel with the first treating solution, and contacting the article in the processing vessel with the second treating solution. The first treating solution may be a pre-wash solution, a wash solution, or a coating solution, and the second treating solution may be a wash solution, a coating solution, or a rinse solution. The articles may be various substrates including, but not limited to, fabric substrates, metal substrates, and electronic devices, to name just a few. The operation of contacting the article with the wash solution may include removing polymeric materials, such as resins, adhesive, coatings, and inks, from the article.

In other embodiments of the present invention, at least one of the first or second treating solutions is an impregnating solution that includes an impregnating agent. The operation of contacting the article with the impregnating solution includes impregnating the article with the impregnating agent. The article may be a porous material and the impregnating agent may be insect treatments, pigments, strength enhancers, water repellants or pollution repellants.

In still other embodiments of the present invention, at least one of the first or the second treating solutions is an extracting solution, and the operation of contacting the article with the extracting solution includes extracting a substance from the article using the extracting solution.

In yet other embodiments of the present invention, at least one of the first or the second treating solutions is a developing solution. The operation of contacting the article with the developing solution includes developing a resist on a semiconductor substrate using the developing solution.

In other embodiments of the present invention, the methods of utilizing a divided storage vessel includes the operation of synthesizing a chemical compound by combining the first treating solution with the second treating solution. The first treating solution is a first reacting solution that includes a first reactant and the second treating solution is a second reacting solution that includes a second reactant.

In still other embodiments of the present invention, the methods of utilizing a divided storage vessel includes polymerizing one or more monomers by combining the first treating solution with the second treating solution where the first treating solution includes a first monomer and the second treating solution includes an initiator or a second monomer.

In yet other embodiments of the present invention, the methods of utilizing a divided storage vessel includes purifying a chemical compound by combining the first treating solution comprising the chemical compound with a third treating solution substantially devoid of liquid carbon dioxide.

Cleaning methods are also provided by the present invention. Cleaning methods according to the present invention include transferring a first densified gas based treating solution from a first liquid chamber of a divided working tank to a wash tank containing an article, contacting the article with the first liquid, returning the first treating solution from the wash tank to the divided working tank, transferring a second densified gas based treating solution from a second liquid chamber of the divided working tank to the wash tank, contacting the article with the second treating solution, and returning the second treating solution from the wash tank to the divided working tank. The method may include storing a plurality of densified gas based treating solutions present as two-phase systems in a divided storage vessel having a plurality of liquid chambers that share a common vapor space.

Dry cleaning methods are also provided by the present invention. Dry cleaning methods according to the present invention include transferring a first densified gas based dry-cleaning solution from a first liquid chamber of a divided working tank to a wash tank containing a dry-cleanable article, contacting the dry-cleanable article with the first liquid, returning the first dry-cleaning solution from the wash tank to the divided working tank, transferring a second densified gas based dry-cleaning solution from a second liquid chamber of the divided working tank to the wash tank, contacting the dry-cleanable article with the second dry-cleaning solution, and returning the second dry-cleaning solution from the wash tank to the divided working tank. The method may include storing a plurality of densified gas based dry-cleaning solutions present as two-phase systems in a divided storage vessel having a plurality of liquid chambers that share a common vapor space.

In embodiments of the present invention, the first dry-cleaning solution is a pre-wash solution, a wash solution, or a coating solution, and the second dry-cleaning solution is a wash solution, a coating solution, or a rinse solution.

In other embodiments of the present invention, the operation of returning the first dry-cleaning solution from the wash tank to the divided working tank includes returning the first dry-cleaning solution from the wash tank to the first chamber of the divided working tank. The operation of returning the second dry-cleaning solution from the wash tank to the divided working tank includes returning the second dry-cleaning solution from the wash tank to the second chamber of the divided working tank. The second liquid may be distilled in the second liquid chamber to form still bottoms and vapor consisting essentially of carbon dioxide.

In still other embodiments of the present invention, dry cleaning methods include transferring a first volume of the first dry-cleaning solution from the first liquid chamber into a third liquid chamber of the divided working tank before transferring a first dry-cleaning solution from the first liquid chamber to the wash tank. The operation of transferring a first volume includes equilibrating the liquid levels in the first liquid chamber and the third liquid chamber. The dry cleaning methods include transferring a second volume of the first dry-cleaning solution from the third liquid chamber into the first liquid chamber after transferring a first dry-cleaning solution from the first liquid chamber to the wash tank, such that a third volume of the first dry-cleaning solution remains in the third liquid chamber. The operation of transferring a second volume includes equilibrating the liquid levels in the first liquid chamber and the second liquid chamber. The second volume of dry-cleaning solution is transferred from the first liquid chamber to the wash tank. The third volume of the first dry-cleaning solution is distilled in the third liquid chamber. The distilling operation includes boiling the third volume of the first dry-cleaning solution in the third liquid chamber to form still bottoms and carbon dioxide vapor, condensing the vapor from the third liquid chamber to form liquid carbon dioxide, collecting the liquid in the second liquid chamber, and purging the still bottoms from the third liquid chamber. The operation of returning the first dry-cleaning solution from the wash tank to the divided working tank includes returning the first dry-cleaning solution from the wash tank to the first liquid chamber. The operation of returning the second dry-cleaning solution from the wash tank to the divided working tank includes the step of returning the second dry-cleaning solution from the wash tank to the first liquid chamber. Alternatively, the operation of returning the second dry-cleaning solution from the wash tank to the divided working tank may include the step of returning the second dry-cleaning solution from the wash tank to the third liquid chamber. The second dry-cleaning solution may be distilled in the third liquid chamber. A coating adjunct may be added to the second dry-cleaning solution before, during or after the operation of transferring the second dry-cleaning solution from the second liquid chamber to the wash tank.

In yet other embodiments of the present invention, dry cleaning methods include transferring a first volume of the first dry-cleaning solution from the first liquid chamber into a third liquid chamber of the divided working tank before transferring a first dry-cleaning solution from the first liquid chamber to the wash tank. The first volume of the first dry-cleaning solution is transferred from the third liquid chamber to the wash tank before transferring a first dry-cleaning solution from the first liquid chamber to the wash tank. A pre-wash adjunct may be added to the first volume of the first dry-cleaning solution to form a pre-wash solution. The pre-wash adjunct may be added before, during, or after transferring the first volume of the first dry-cleaning solution from the third liquid chamber to the wash tank. The methods include contacting the article with the pre-wash solution, and returning the pre-wash solution from the wash tank to the third liquid chamber of the divided working tank before transferring a first dry-cleaning solution from the first liquid chamber to the wash tank. The pre-wash solution may be distilled in the third liquid chamber. The distilling operation may occur during at least one of the foregoing operations. The operation of returning the second dry-cleaning solution from the wash tank to the divided working tank may include returning the second dry-cleaning solution from the wash tank to the first liquid chamber.

A divided working tank for use in a carbon dioxide based system is also provided by the present invention. The divided working tank includes an exterior wall defining an interior volume and capable of withstanding an internal pressure of at least about 500 psig, a first dividing member extending from an interior surface of the exterior wall and defining a first and a second liquid chamber in the divided pressure vessel, the first and the second liquid chambers sharing a common vapor space, and a first treating solution consisting essentially of densified gas positioned in the first liquid chamber. The densified gas is preferably liquid carbon dioxide.

In embodiments of the present invention, the divided working tank includes a second dividing member defining a third liquid chamber. The third liquid chamber shares the common vapor space with the first and the second liquid chambers. The second liquid chamber is positioned between the first liquid chamber and the third liquid chamber. A heating element is operatively associated with the third liquid chamber.

In other embodiments of the present invention, the divided working tank includes a first opening in the exterior wall adjacent the first liquid chamber for liquid transfer into and/or out of the first liquid chamber, a second opening in the exterior wall adjacent the second liquid chamber for liquid transfer into and/or out of the second liquid chamber, a third opening in the exterior wall adjacent the third liquid chamber for liquid transfer into and/or out of the third liquid chamber, and a fourth opening in the exterior wall adjacent the common vapor space for fluid transfer into and/or out of the common vapor space. The fourth opening is preferably positioned above the third liquid chamber.

In still other embodiments of the present invention, the divided working tank includes a second densified gas based treating solution positioned within the second liquid chamber. The first and the second treating solutions have different compositions.

A dry cleaning system employing a carbon dioxide based solvent is also provided by the present invention. The dry cleaning system includes a divided working tank configured to store a plurality of densified gas based dry-cleaning solutions having different compositions as described above and a wash tank configured to contact a dry-cleanable article to be cleaned with one or more of the plurality of dry-cleaning solutions. The wash tank is in fluid communication with the divided working tank.

In embodiments of the present invention, the cleaning system may include a liquid transfer system that provides liquid communication between the divided working tank and the wash tank, and a vapor transfer system that provides vapor communication between the divided working tank and the wash tank. The first, the second, and the third openings of the divided working tank may be in liquid communication with the liquid transfer system. The fourth opening of the divided working tank may be in fluid communication (i.e., liquid and/or vapor communication) with the vapor transfer system. The vapor transfer system may include a condenser that is in fluid communication with the fourth opening of the exterior wall of the divided working tank.

In embodiments of the present invention, methods of utilizing a divided storage vessel include transferring a first treating adjunct from a first chamber in a divided storage vessel having a plurality of chambers that share a common vapor space to a processing vessel, transferring a densified fluid comprising a liquid densified gas or a supercritical fluid into the processing vessel, removing the first treating adjunct from the processing vessel, transferring a second treating adjunct having a composition different from the first treating adjunct from a second chamber in the divided storage vessel to the processing vessel, and removing the second treating adjunct from the processing vessel.

In other embodiments of the present invention, methods of utilizing a divided storage vessel include charging a first densified fluid comprising a liquid densified gas or a supercritical fluid into a processing vessel, removing the first densified fluid from the processing vessel, charging the first densified fluid into a first liquid chamber in a divided storage vessel having a plurality of liquid chambers that share a common vapor space, charging a second densified fluid comprising a liquid densified gas or a supercritical fluid into the processing vessel, removing the second densified fluid from the processing vessel, and charging the second densified fluid into a second liquid chamber in the divided storage vessel.

Methods and apparatus according to the present invention may therefore provide the operational efficiency associated with a densified gas based processing system having multiple solvent baths stored in various separate tanks at a lower capital costs than such processing systems. It will be understood that the present invention may be embodied as methods and apparatus and combinations thereof.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As used herein, "fluid communication" means liquid and/or vapor communication. As used herein, "densified gas" means a liquid fluid that is gaseous at ambient conditions. Examples include carbon dioxide, helium, nitrogen, air, methane, ethane, propane, butane, ammonia, and nitrous oxide. Preferably, the densified gas is carbon dioxide. As used herein, "densified fluid" means a liquid or supercritical fluid that is gaseous at ambient conditions. Examples include carbon dioxide, helium, nitrogen, air, methane, ethane, propane, butane, ammonia, and nitrous oxide. Preferably, the densified fluid is carbon dioxide.

Figure 1:
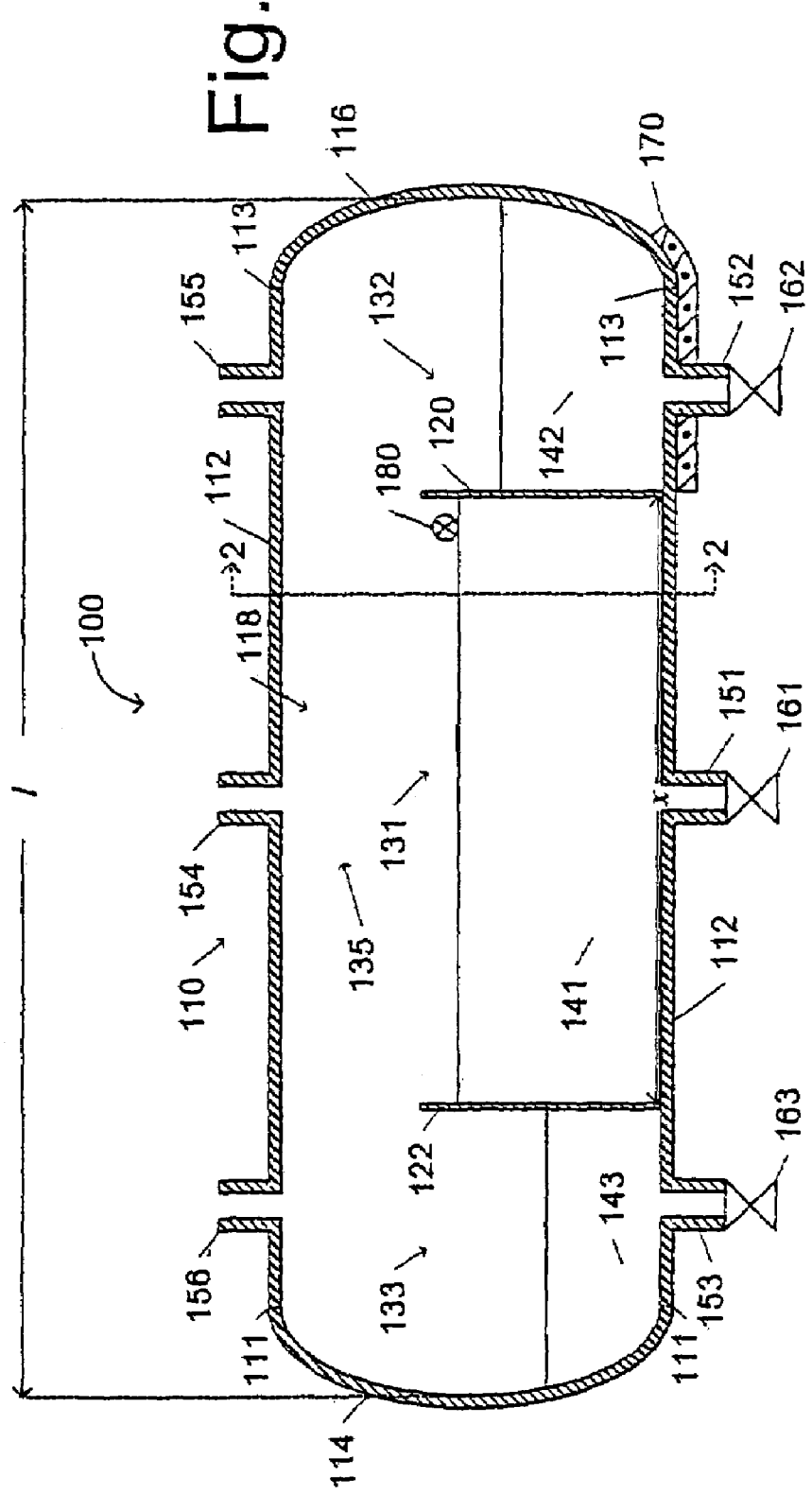
FIG. 1 is a front section view of a divided pressure vessel according to the present invention having a horizontal orientation.
Figure 2:
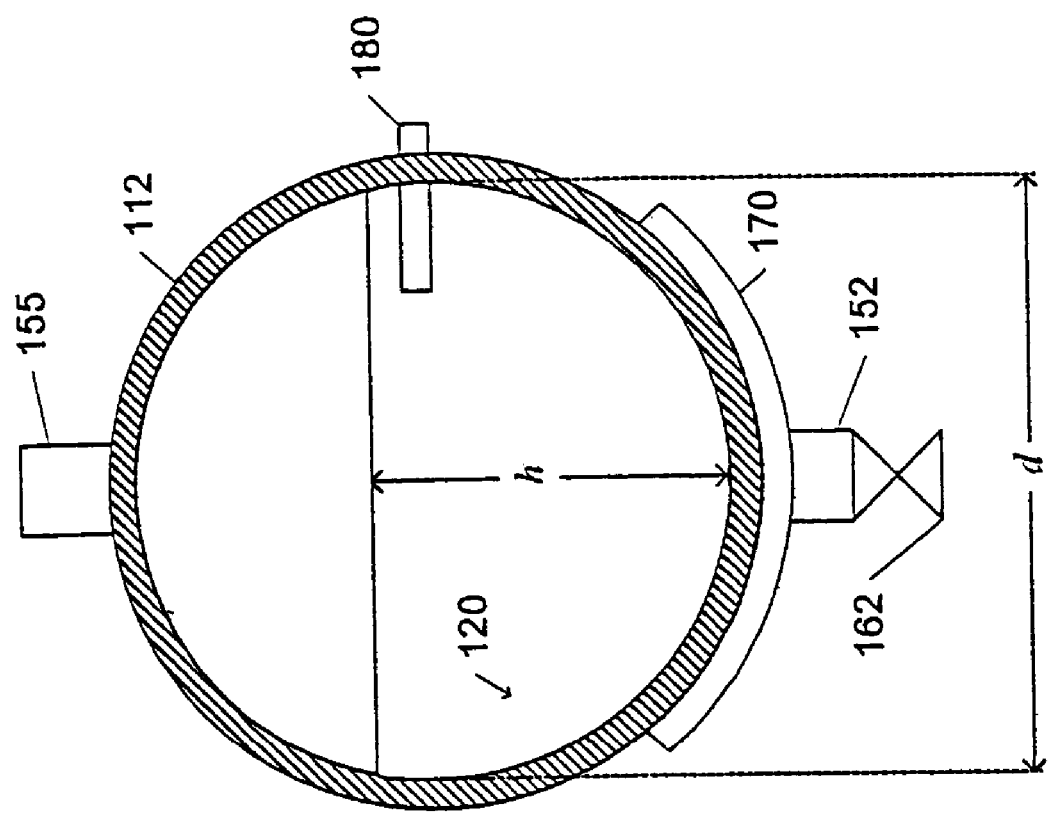
FIG. 2 is an end section view taken along line 2—2 of the vessel of FIG. 1.

Referring first to FIGS. 1 and 2, an embodiment of a divided pressure vessel 100 according to the present invention having a cylindrical configuration and a horizontal orientation will now be described. The divided pressure vessel 100 has an exterior wall 110 defining a cylindrical interior volume 118. While the embodiment illustrated in FIG. 1 shows an exterior wall 110 defining a cylindrical interior volume 118, it is to be understood that exterior walls of the present invention may define various other shapes of interior volumes including, but not limited to, spherical and cubic, which includes rectangular.

As illustrated in FIG. 1, the exterior wall 110 includes a longitudinally extending side wall member 112, a first end wall member 114, and a second end wall member 116. The side wall member 112 extends circumferentially to define an interior volume 118. As illustrated by the embodiment of FIG. 2, the side wall member 112 extends circumferentially to form a divided pressure vessel having a cylindrical interior volume with a circular lateral cross-section. However, it is to be understood that side wall members of the present invention may extend circumferentially to form divided pressure vessels of the present invention having various lateral cross-sections including rectangular cross-sections, among others. As used herein, the term "rectangular" encompasses square cross-sections. While the embodiment illustrated in FIG. 1 shows a side wall member 112 having a substantially straight longitudinal cross-section, it is to be understood that side wall members according to the present invention may have various other longitudinal cross-sections, including but not limited to arcuately shaped cross-sections. Side wall members and first and second end wall members according to the present invention may be arcuately shaped to define a spherical interior volume.

As shown in FIG. 1, the side wall member 112 has a first end portion 111 and a second end portion 113 longitudinally spaced from the first end portion 111. The first end wall member 114 is coupled to the first end portion 111 of the side wall member 112. The second end wall member 116 is coupled to the second end portion 113 of the side wall member 112. Although the embodiment of FIG. 1 shows first and second end wall members 114 and 116, respectively, having a generally arcuate shape, it is to be understood that end wall members of the present invention may have various other shapes including, but not limited to, planar.

As illustrated in FIG. 1, a first dividing member 120 extends from an interior side of the exterior wall 110. The first dividing member 120 defines a first chamber 131 and a second chamber 132 within the divided pressure vessel 100. The first chamber 131 and the second chamber 132 share a common vapor space 135. A second dividing member 122 is longitudinally spaced from the first dividing member 120 and extends from the interior side of the exterior wall 110. The second dividing member 122 defines a third chamber 133 within the divided pressure vessel 100. The third chamber 133 shares the common vapor space 135 with the first and the second chambers 131 and 132, respectively.

Although the embodiment illustrated in FIG. 1 shows the dividing pressure vessel 100 having first and second dividing members 120 and 122, respectively, it is to be understood that divided pressure vessels of the present invention may have fewer or more dividing members, although two dividing members are preferred. While the embodiment of the divided pressure vessel illustrated in FIG. 1 shows first and second dividing members 120 and 122, respectively, that only extend a portion of the way across the divided pressure vessel 100, it is to be understood that dividing members according to the present invention may extend completely across the divided pressure vessels. However, when a dividing member according to the present invention extends completely across the divided pressure vessel, a line or other vapor passage structure should connect the vapor spaces of the adjacent chambers defined by the dividing member such that the vapor spaces of the adjacent chambers may not be isolated from one another. Thus, the adjacent chambers will still share a common vapor space, and the pressure in each chamber will be the same. Dividing members of the present invention are preferably built to withstand the hydrostatic pressure of the dry-cleaning solution(s) contained in the liquid chambers adjacent the dividing member, but not to withstand system pressure. Thus, divided pressure vessels of the present invention may reduce the capital costs associated with providing a multi-bath system. Although the embodiments illustrated in FIG. 1 show a horizontally oriented divided pressure vessel 100 having substantially vertically oriented dividing members 120 and 122, it is to be understood that horizontally oriented divided pressure vessels of the present invention may have dividing members that are oriented other than vertically. For example, embodiments of horizontally oriented dividing members are described below with reference to FIGS. 3 and 4.

As shown in FIG. 1, the first and the second dividing members 120 and 122, respectively, are continuous members that preclude internal liquid communication through the dividing members. As used herein, "internal liquid communication" is liquid communication that occurs within the divided pressure vessel. Put another way, the first and the second dividing members 120 and 122, respectively, are impermeable to liquid carbon dioxide solutions. Thus, a liquid carbon dioxide solution may be stored in one chamber without contaminating another liquid carbon dioxide solution that is stored in an adjacent chamber. As a result, a first liquid solution contained in the first chamber 131 may include one or more constituents that are different from the constituents in a second liquid solution contained in the second chamber 132. For example, the first liquid solution may consist of liquid carbon dioxide while the second liquid solution contains one or more cleaning adjuncts. While the embodiments illustrated in FIG. 1 show first and second dividing members 120 and 122 as continuous members, it is to be understood that dividing members of the present invention may be discontinuous members (e.g., a valve may reside in the dividing member), although continuous members are preferred. If the dividing member is discontinuous having a valve residing therein, it is preferable that the valve is a two-way valve.

As illustrated in FIG. 1, several openings in the exterior wall 110 of the divided pressure vessel 100 allow fluid transfer into and/or out of the divided pressure vessel 100. A first opening 151 in the exterior wall 110 is adjacent the first liquid chamber 131. The first opening 151 may be used for liquid transfer into and/or out of the first liquid chamber 131. A second opening 152 in the exterior wall 110 is adjacent the second liquid chamber 132 and may be used for liquid transfer into and/or out of the second liquid chamber 132. A third opening 153 in the exterior wall 110 is adjacent the third liquid chamber 133. The third opening 153 may be used for liquid transfer into and/or out of the third liquid chamber 133. A fourth opening 154, a fifth opening 155, and a sixth opening 156 in the exterior wall 110 are adjacent the common vapor space 135. The fourth, the fifth, and the sixth openings 154, 155, and 156, respectively, may be used for vapor transfer into and/or out of the common vapor space 135. Additionally, the fourth opening 154 may also be used for liquid transfer into the first liquid chamber 131, the fifth opening 155 may also be used for liquid transfer into the second liquid chamber 132, and the sixth opening 156 may also be used for liquid transfer into the third liquid chamber 133.

While the embodiments illustrated in FIG. 1 show the first, the second, and the third openings 151, 152, and 153, respectively, positioned at the bottom of the divided pressure vessel 100, it is to be understood that openings that allow liquid transfer into and/or out of divided pressure vessels of the present invention may be positioned at other locations in the exterior wall that are below the liquid level. Although the embodiments shown in FIG. 1 illustrate fourth, fifth, and sixth openings 154, 155, and 156, respectively, which allow vapor transfer into and/or out of the divided pressure vessel 100, it is to be understood that divided pressure vessels of the present invention may have as few as one such opening adjacent the common vapor space. When only one opening is provided, it is preferable that the opening be positioned above the third liquid chamber 133 (i.e., the sixth opening 156). While the embodiments illustrated in FIG. 1 show the fourth, the fifth, and the sixth openings 154, 155, and 156, respectively, positioned at the top of the divided pressure vessel 100, it is to be understood that openings that allow vapor transfer into and/or out of divided pressure vessels of the present invention may be positioned at other locations in the exterior wall that are above the liquid level (i.e., adjacent the common vapor space). While the embodiments illustrated in FIG. 1 show liquid and vapor inlets and outlets (first through sixth openings) that penetrate the exterior wall of the divided pressure vessel, it is to be understood that chamber inlets and outlets may be provided from one or more internal headers, where the one or more internal headers penetrate the exterior wall.

As illustrated in FIG. 1, the first, the second, and the third openings 151, 152, and 153, respectively, are coupled to isolation valves 161, 162, and 163. As will be understood by those skilled in the art, isolation valves 161, 162, and 163 may be various types of valves including, but not limited to, ball, 2 or 3 way butterfly, gate, globe, or check valves, to name just a few. Although the embodiments illustrated in FIG. 1 show isolation valves 161, 162, and 163, it is to be understood that various isolation means known to those skilled in the art may be used, including, but not limited to, liquid fluid columns such as u-tubes, and pumps such as positive displacement pumps or rotary pumps with an upstream check valve.

As shown in FIG. 1, the divided pressure vessel 100 contains various carbon dioxide based treating solutions. A first treating solution 141 resides in the first liquid chamber 131. A second treating solution 142 resides in the second liquid chamber 132, and a third treating solution 143 resides in the third liquid chamber 133. At least one of the first, the second, or the third treating solutions 141, 142, or 143, respectively, is a liquid carbon dioxide based treating solution. As used herein, "carbon dioxide based" treating solutions are treating solutions that comprise greater than 50% by volume liquid carbon dioxide. Preferably, at least two of the first, the second, or the third treating solutions 141, 142, or 143, respectively, are liquid carbon dioxide based treating solutions. More preferably, at least two treating solutions comprise greater than about 60% or 75% by volume, most preferably greater than about 90% by volume, liquid carbon dioxide and the remaining treating solution consists of or consists essentially of liquid carbon dioxide. Treating solutions of the present invention may also include various other materials that are specific to the particular processing application, as will be understood by those skilled in the art. For example, in dry cleaning applications, treating solutions of the present invention may be pre-wash solutions, wash solutions, coating solutions, or rinse solutions, among others, and may include detergents, bleaches, whiteners, softeners, sizing, starches, enzymes, hydrogen peroxide or a source of hydrogen peroxide, fragrances, and coating adjuncts, among other materials. In polymer synthesis applications, treating solutions may include various monomers and initiators, among other materials. In cleaning/processing of hard surfaces, treating solutions may include cleaning adjuncts, rinsing adjuncts, coating adjuncts, and passivation adjuncts, just to name a few. While the embodiments illustrated in FIG. 1 show treating solutions 141, 142, and 143, respectively, residing in each of the first, the second, and the third chambers 131, 132, and 133, respectively, it is to be understood that one or more chambers of the divided pressure vessels of the present invention may be devoid of carbon dioxide based treating solution.

As illustrated in FIG. 1, the divided pressure vessel includes a heating element 170 operatively associated with the second chamber 132. The heating element 170 is preferably a partial steam jacket, but may be various heating elements as will be understood by those skilled in the art. Although the embodiments illustrated in FIG. 1 show a single heating element 170, it is to be understood that divided pressure vessels of the present invention may have multiple heating elements operatively associated with one or more chambers or may not include a heating element. While the embodiments illustrated in FIG. 1 show the heating element 170 as not penetrating the exterior wall 110, it is to be understood that heating elements of the present invention that penetrate the exterior wall (e.g., an internal coil heater) are also operatively associated with a liquid chamber. However, heating elements that do not penetrate the exterior wall are preferred because, among other things, the integrity of the exterior wall is maintained and concerns about fouling and overpressurization of the heating system due to a defective internal coil can be reduced.

As shown in FIG. 1, a single operating level sensor 180 is positioned within the divided pressure vessel 100. More specifically, the level sensor 180 is positioned within the first liquid chamber 131. The level sensor 180 is capable of sensing the level of carbon dioxide based treating solution in the first liquid chamber 131 and is used to control the upper liquid level in the first liquid chamber 131. As will be understood by those skilled in the art, the level sensor 180 may be selected from various level sensors including, but not limited to, float-actuated devices, displacer-actuated devices, head devices, level-sensors that measure electrical characteristics (electrical devices) such as conductivity and capacitance, thermal devices, and sonic devices, among others. Preferably, the level sensor 180 is a non-mechanical level sensor (i.e. has no moving parts in contact with the liquid being measured) such as an electrical device, a thermal device, or a sonic device. More preferably, the level sensor 180 is an ultra sonic sensor. Most preferably, the level sensor 180 is a Sensall SE98-067, which is commercially available. Although multiple operating level sensors may be used, it is preferable to use a single operating level sensor instead of multiple operating level sensors to control the liquid levels in a divided pressure vessel having two or more liquid chambers. More preferably, only a single operating level sensor is used to control the liquid levels in a divided pressure vessel having three liquid chambers. By using a single operating level sensor rather than multiple level sensors, the capital cost of the divided pressure vessel may be reduced, a pressure vessel may be provided with fewer penetrations through its exterior wall thereby increasing the integrity of the divided pressure vessel, and the divided pressure vessel may have fewer components that are susceptible to failure.

Divided working tanks of the present invention may have various dimensions, as will be understood by those skilled in the art. For a working tank having a cylindrical or cubic interior volume, the working tank has a length, as illustrated by l in FIGS. 1 and 3, that is preferably between 24 inches and 120 inches, more preferably between 36 inches and 108 inches, and most preferably between 48 inches and 96 inches. The cylindrical working tank (cubic working tank) has an inside diameter (inside width and/or height), as illustrated by d in FIGS. 1 and 3, preferably between 6 inches and 96 inches, more preferably between 12 inches and 84 inches, and most preferably between 18 inches and 48 inches. These preferred ranges may also be used to describe the inside diameter of a divided spherical working tank of the present invention. The ratio of the inside diameter of the cylindrical working tank (width and/or height of the cubic working tank) to the length of the working tank is preferably between 1:1 and 1:5, more preferably between 1:1.25 and 1:4, and most preferably between 1:1.5 and 1:3.

The liquid chambers of divided working tanks of the present invention may have various volumes, as will be understood by those skilled in the art. The volume of a liquid chamber having one or more dividing members but no operating level sensor is measured as the volume of the liquid chamber to the top of the lowest dividing member adjacent that liquid chamber. The volume of a liquid chamber having an operating level sensor positioned therein is measured as the volume maintained using the level sensor. The first liquid chamber has a volume that is preferably between 5 and 250 gallons, more preferably between 10 and 150 gallons, and most preferably between 20 and 75 gallons. The second liquid chamber has a volume that is preferably between 5 and 125 gallons, more preferably between 10 and 75 gallons, and most preferably between 10 and 50 gallons. The third liquid chamber has a volume that is preferably between 5 and 125 gallons, more preferably between 10 and 75 gallons, and most preferably between 10 and 50 gallons. The ratio of the volume of the first liquid chamber to the volume of the second liquid chamber to the volume of the third liquid chamber is preferably between 1:0.1:0.1 and 1:1.5:1.5, more preferably between 1:0.25:0.25 and 1:1:1, and most preferably between 1:0.35:0.35 and 1:0.75:0.75. When the divided working tank is used in a dry cleaning system having a wash tank, the ratio of the volume of the wash tank to the volume of the first liquid chamber to the volume of the second liquid chamber to the volume of the third liquid chamber is preferably between 10:1:0.1:0.1 and 10:20:30:30, more preferably between 10:1.5:0.4:0.4 and 10:10:10:10, and most preferably between 10:2:0.75:0.75 and 10:5:3.5:3.5.

Figure 3:
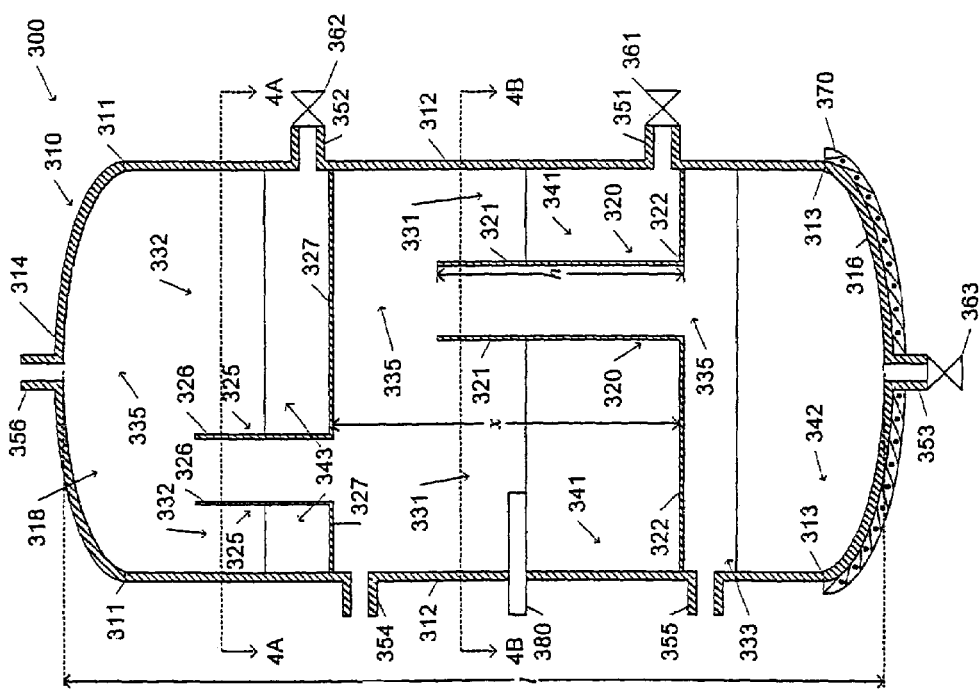
FIG. 3 is a front section view of a divided pressure vessel according to the present invention having a vertical orientation.

The dividing members of the present invention may have various dimensions, as will be understood by those skilled in the art. While the embodiment of FIG. 1 shows first and second dividing members 120 and 122, respectively, having the same height, it is to be understood that dividing members of the present invention may have the same or different heights, although dividing members of the same height are preferred. The height of a dividing member is the vertical distance measured from the lowest point of the dividing member to the top of the dividing member, as illustrated by h in FIGS. 2 and 3. The height of a dividing member is preferably between 6 and 96 inches, more preferably between 12 and 84 inches, and most preferably between 18 and 48 inches. The ratio of the height of a dividing member to the inside diameter of the cylindrical divided working tank (depth of a cubic divided working tank) is preferably between 0.25:1 and 1:1, more preferably between 0.5:1 and 0.95:1, and most preferably between 0.75:1 and 0.95:1. The longitudinal separation between adjacent dividing members, as illustrated by x in FIGS. 1 and 3, is the distance measured from the lowest point of one dividing member to the lowest point of the adjacent dividing member. The longitudinal separation of dividing members of the present invention is preferably between 10 and 100 inches, more preferably between 20 and 80 inches, and most preferably between 30 and 60 inches. The ratio of the longitudinal separation to the inside diameter of the cylindrical working tank (width of the cubic working tank) is preferably between 0.25:1 and 2:1, more preferably between 0.4:1 and 1.5:1, and most preferably between 0.75:1 and 1.25:1.

Referring now to FIGS. 3 and 4, a divided pressure vessel 300 according to the present invention having a cylindrical configuration and a vertical orientation will now be described. The divided pressure vessel 300 has an exterior wall 310 defining an interior volume. While the embodiment illustrated in FIG. 3 shows an exterior wall 310 defining a cylindrical interior volume 318, it is to be understood that exterior walls of the present invention may define various other shapes of interior volumes including, but not limited to, spherical and cubic.

The components having reference numerals 311–316 and 331–380 may be described and operate in substantially the same manner as the components having reference numerals 111–116 and 131–180 as described above with reference to FIG. 1 and will not be further described.

As illustrated in FIG. 3, a first dividing member 320 extends substantially horizontally from the exterior wall 310. The first dividing member 320 has a first tubular upright portion 321 extending from a first horizontal portion 322.

Figure 4B:
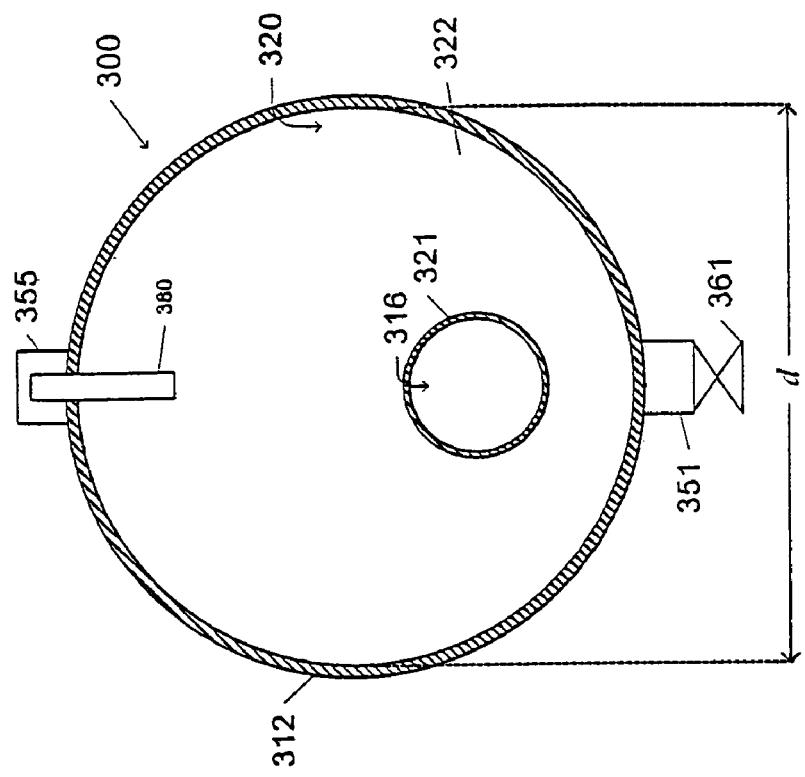
FIG. 4B is a top section view taken along line 4B—4B of the vessel of FIG. 3.
Figure 4A:
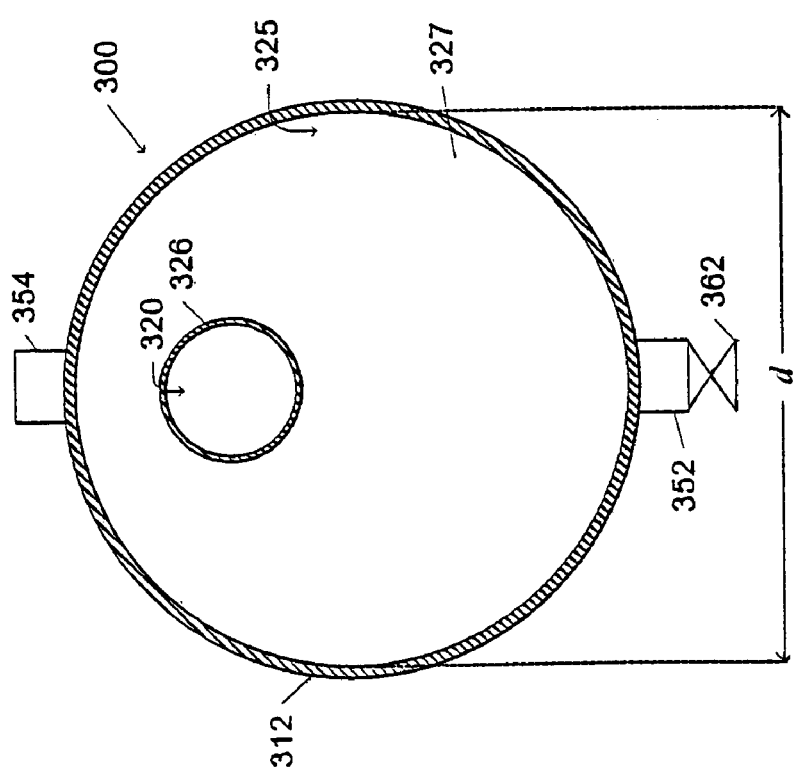
FIG. 4A is a top section view taken along line 4A—4A of the vessel of FIG. 3.

The first dividing member 320 defines a first chamber 331. A second dividing member 325 extends substantially horizontally from the exterior wall 310. The second dividing member 325 has a second tubular upright portion 326 extending from a second horizontal portion 327. The second dividing member 325 defines a second chamber 332. A third chamber 333 is defined by the second end wall member 316 and the side wall member 312. The first upright portion 321 defines a hole in the first horizontal portion 322 and the second upright portion 326 defines a hole in the second horizontal portion 327 such that the first, the second, and the third chambers 331,332, and 333, respectively, share a common vapor space 335. The holes defined by the first and the second upright portions 321 and 326, respectively, may have various lateral cross-sections. For example, as illustrated in FIG. 4A, the second tubular upright portion 326 defines a circular hole in the second horizontal portion 327, and, as illustrated in FIG. 4B, the first tubular upright portion 321 defines a circular hole in the first horizontal portion 322. The first and the second dividing members 320 and 325, respectively, are designed to support the weight of the first and the second treating solutions 341 and 342, respectively, as will be understood by those skilled in the art. For example, the first and the second dividing members 320 and 325, respectively, have a thickness that is preferably between about 0.01, 0.1, or 0.125 inch and about 0.25, 0.5, or 1 inch.

While the embodiment illustrated in FIG. 3 shows a second upright portion 326 that is longer than the first upright portion 321, it is to be understood that first and second upright portions of the present invention may be the same size or may be different sizes, depending, at least in part, on the volume of liquid solution to be contained in the respective chambers. Although the embodiment illustrated in FIG. 3 shows first and second upright portions 321 and 326, respectively, that are substantially perpendicular to first and second horizontal portions 322 and 327, respectively, it is to be understood that upright portions of the present invention need not be perpendicular to horizontal portions. While the embodiment illustrated in FIG. 3 shows a vertically oriented divided pressure vessel 300 having substantially horizontally oriented dividing members 320 and 325, it is to be understood that vertically oriented divided pressure vessels of the present invention may have dividing members that are oriented other than horizontally. For example, embodiments of vertically oriented dividing members are described above with reference to FIGS. 1 and 2.

Although the embodiment illustrated in FIG. 3 shows first and second dividing members 320 and 325, respectively, having first and second upright portions 321 and 326, respectively, that define holes in first and second horizontal portions 322 and 327, respectively, it is to be understood that dividing members of the present invention may not have upright portions that define holes in horizontal portions, which is to say that horizontal portions of the present invention may be solid. However, if horizontal portions of the present invention are solid, a line or other vapor passage structure should connect the vapor spaces of the adjacent chambers defined by the solid dividing member such that the vapor spaces of the adjacent chambers may not be isolated from one another. Thus, the adjacent chambers will still share a common vapor spare.

As will be understood by those skilled in the art, divided pressure vessels of the present invention have exterior walls that are designed to withstand system temperature and pressure. For carbon dioxide based systems that store carbon dioxide solutions at or near saturated conditions, system temperatures may be between about 55 to 62° F. (10 to 17° C.) at system pressures between about 681 to 756 psig. As divided working tanks of the present invention are capable of storing liquid carbon dioxide, exterior walls of the present invention are capable of withstanding an internal pressure greater than about 500 psig, more preferably greater than about 600 psig, and most preferably greater than about 750 psig. Exterior walls are preferably constructed of metal, more preferably of stainless steel, and most preferably Type 304 stainless steel. However, it is to be understood that the exterior walls according to the present invention may be constructed of various other metals and materials that will withstand system temperature and pressure including, but not limited to, carbon steel, aluminum, ceramics, carbon steel alloys, aluminum alloys, copper alloys, and composite materials.

Dividing members according to the present invention may be constructed of various materials including, but not limited to, metals, ceramics, plastics, and composite materials. Dividing members are preferably constructed of metal. The metal is preferably selected from the group consisting of stainless steel, aluminum, carbon steel, carbon steel alloys, aluminum alloys, and copper alloys. Dividing members are most preferably constructed of Type 304 stainless steel. Because adjacent chambers share a common vapor space, the liquids in adjacent chambers are maintained at the same pressure. Thus, the dividing members do not form pressure barriers between adjacent chambers. As a result, dividing members of the present invention need not be constructed to withstand the pressure differentials experienced by the exterior walls of the divided pressure vessel. Thus, dividing members may be constructed inexpensively.

Figure 5:
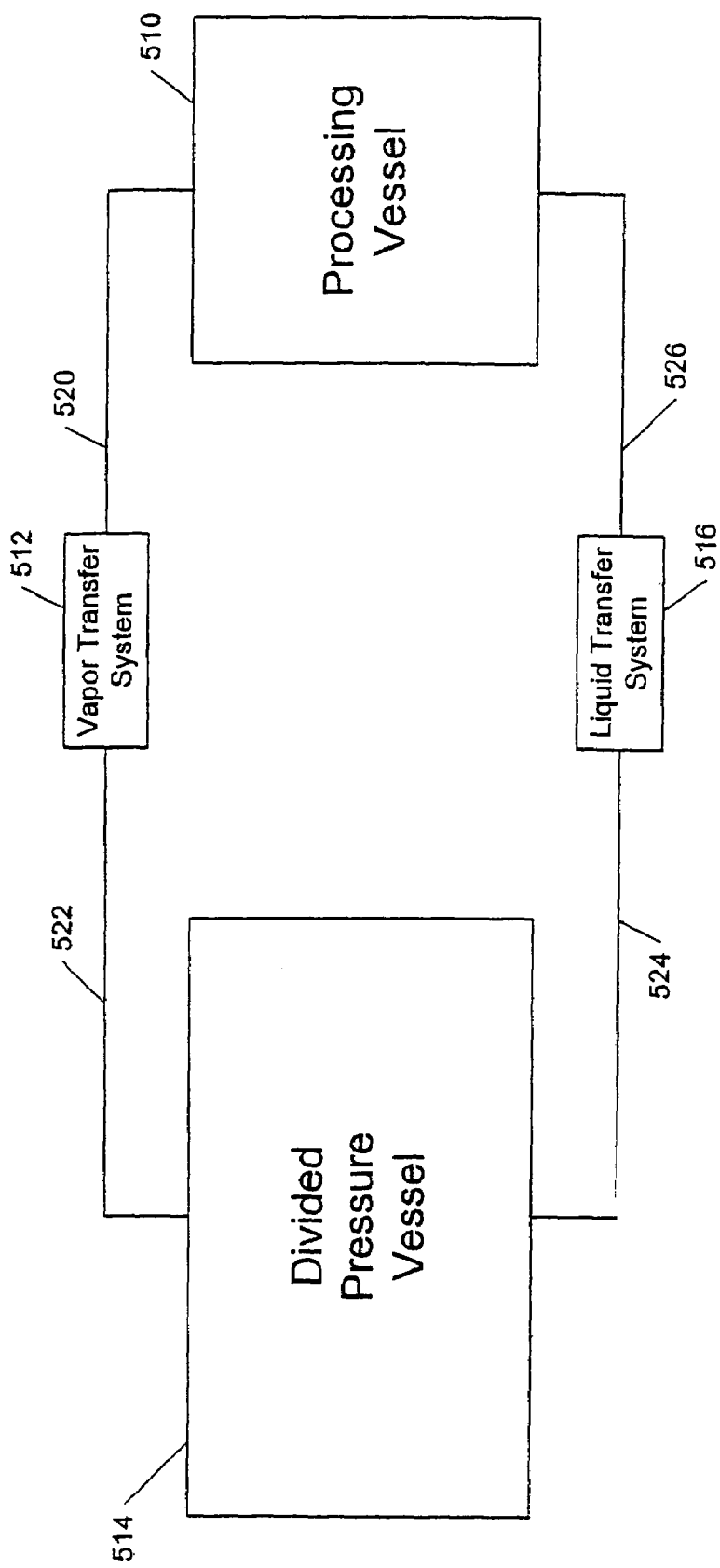
FIG. 5 is a schematic diagram illustrating embodiments of a processing system according to the present invention employing a carbon dioxide based solvent and having a divided pressure vessel.

Referring now to FIG. 5, an embodiment of a processing system employing a carbon dioxide solvent and utilizing a divided pressure vessel according to the present invention will now be described. A processing system 500 has a processing vessel 510 in fluid communication with a divided pressure vessel 514. Vapor fluid communication is provided by vapor transfer system 512 and lines 520 and 522. Liquid communication is provided by liquid transfer system 516 and lines 524 and 526. While the embodiment illustrated in FIG. 5 shows a processing system having both a vapor and a liquid transfer system, it is to be understood that processing systems of the present invention may have only a vapor transfer system, or only a liquid transfer system, or may have a fluid transfer system that transfers both vapor and liquid. The vapor transfer system 512 may consist of a line or may comprise various components including, but not limited to, one or more of the following: valves, lines, compressors, condensers, vapor tanks, and moisture separators, among other components. The liquid transfer system 516 may consist of a line or may comprise various components including, but not limited to, one or more of the following: valves, lines, pumps, and filters. As will be understood by those skilled in the art, lines, as used herein, may be selected from the group comprising piping, conduit, and other means of fluid communication that can withstand system temperature and pressure.

As will be understood by one skilled in the art, various processes employing a carbon dioxide solvent may be performed utilizing processing systems according to the present invention including, but not limited to, cleaning, coating, impregnating, extracting, developing, polymer processing, particle processing and purifying and/or synthesizing chemical compounds. In general, processing systems of the present invention may be particularly suited to performing carbon dioxide based processes that utilize two or more solutions having different compositions. Preferably, the two or more solutions are carbon dioxide based solutions; however, one or more of the solutions may be substantially devoid of liquid carbon dioxide.

Processing systems of the present invention may be used to perform various cleaning processes utilizing a variety of cleaning adjuncts, as will be understood by those skilled in the art. For example, cleaning processes may include the soft and hard cleaning of substrates such as metal, wood, paper, fur, feathers, filtration media, electronics, bio-medical devices/tools/implants, tools, stone and construction materials such as concrete and glass, among others. Cleaning processes may also include the dry cleaning of fabric substrates (e.g., garments, linen, drapery, etc.) and other substrates (e.g., leather) that are typically cleaned in a commercial dry cleaning process (i.e., dry-cleanable articles).

As will be understood by those skilled in the art, processing systems of the present invention may be used to perform various coating processes utilizing a variety of coating adjuncts. For example, coating processes may include coating dry-cleanable articles, and the soft and hard substrates described above, among others. Fabric substrates and leather substrates may be coated with various coating adjuncts such as flame retardants, water repellants, water-resistance agents, water-release agents, sizing agents, sterilizing agents, stain-resistance agents, stain repellants, stain-release agents, anti-bacterial, anti-microbial, anti-viral and other biocide agents, UV resistance agents, and dyes among others. Hard and soft substrates in general may be coated with polymers, as well as many, if not all, of the coatings described for fabric and leather substrates, among other coatings. Electronic substrates may be coated with photoresists, lubricants, insulating layers, conducting layers, polymers, and protecting (e.g., dust resistant) layers, among other coatings.

Processing systems of the present invention may be used to perform various impregnating processes utilizing a variety of impregnating adjuncts, as will be understood by those skilled in the art. For example, materials such as food stuffs and tobacco may be impregnated with flavorings, vitamins, and pharmaceutical compounds, among others; various articles including clothes may be impregnated with perfume, for example; porous materials such as wood, concrete, stone, and brick may be impregnated with insect treatments such as termite repellant, colorant/pigments such as stains, biocides such as anti-fungal and anti-mildew agents, polymers or other strength enhancers, water repellants, pollution repellants, anti-rot agents, and non-skid agents, just to name a few; bio-medical implants may be impregnated with drugs to provide, for example, controlled release, and anti-biofouling agents, among others; seeds, and agricultural products can be impregnated with insect/fungus protectants, water absorbants, fertilizing agents, and growth hormones, just to name a few; and solid phase chemistry.

As will be understood by those skilled in the art, processing systems of the present invention may be used to perform various extracting processes. For example, flavors, vitamins, natural product drugs and drug precursors such as taxol and various steroids, oils, cholesterol, toxins and limonene may be extracted from plants, seeds, animal products (e.g., bovine serums and spinal fluids) food products including meat, fish, nuts, eggs, milk and dairy, vegetable juices, formentation broth, and reaction mixtures, for example.

Processing systems of the present invention may be used to perform various developing processes, as will be understood by those skilled in the art. For example, photoresists (microlithography) in semiconductor fabrication, photographic films, and X-ray films may be developed.

As will be understood by those skilled in the art, processing systems of the present invention may be used to perform various polymerizing processes. For example, polymer synthesis via homogeneous or heterogeneous means may be performed. One or more carbon dioxide based solutions comprising one or more monomers may be combined, in a batch or continuous addition, with one or more carbon dioxide based solutions comprising one or more initiators to form a polymer of the one or more monomers. The resulting polymer may be soluble or insoluble in liquid carbon dioxide. Preferably, the resulting polymer is insoluble in liquid carbon dioxide. Other polymerizing processes include, but are not limited to, extrusion, fiber spinning, extraction, surface treatments, spraying, and RESS, among others.

Processing systems of the present invention may be used to perform various purifying processes, as will be understood by those skilled in the art. For example, a compound to be purified may be suspended or dissolved in a first carbon dioxide based treating solution. The compound to be purified may be substantially insoluble in a second treating solution that is substantially devoid of liquid carbon dioxide. The first and the second treating solution may be combined such that the compound to be purified precipitates out of solution.

As will be understood by those skilled in the art, processing systems of the present invention may be used to perform various synthesizing processes. For example, a first carbon dioxide based reacting solution containing a first reactant may be combined with a second carbon dioxide based reacting solution containing a second reactant to synthesize a chemical compound. The chemical compound synthesized may be various compounds including, but not limited to, drugs, molecular electronic compounds, fine chemicals, and polymers, among others.

As will be understood by those skilled in the art, processing systems of the present invention may be used to perform particle processing such as formation and/or coating of drug particles.

Processing systems according to the present invention are preferably carbon dioxide based systems. As used herein, "carbon dioxide based" systems are systems that utilize a solvent comprising greater than 50% carbon dioxide. More particularly, processing systems according to the present invention are preferably two-phase carbon dioxide based systems. As used herein, "two-phase systems" are systems that have both a liquid and a vapor phase present in the system. The liquid in the two-phase systems may be at saturation conditions or may be sub-cooled. The liquid preferably comprises at least 50% by volume liquid carbon dioxide. The "liquid phase" may include one or more separate liquid phases in addition to the carbon dioxide liquid phase. For example, the "liquid phase" may include an aqueous phase. The vapor in the two-phase system preferably comprises greater than 75% carbon dioxide vapor, more preferably consists essentially of carbon dioxide vapor, and most preferably consists of carbon dioxide vapor. However, the vapor in the two-phase system may comprise various gaseous vapors including, but not limited to carbon dioxide, nitrogen, argon, air, helium, ammonia, chlorofluorocarbons, and hydrofluorocarbons. While two-phase systems are preferable, processing systems according to the present invention may employ vapor, liquid, and/or super-critical carbon dioxide based solvents provided that the carbon dioxide based solvent is stored in the divided pressure vessel as a two-phase system.

Figure 6:
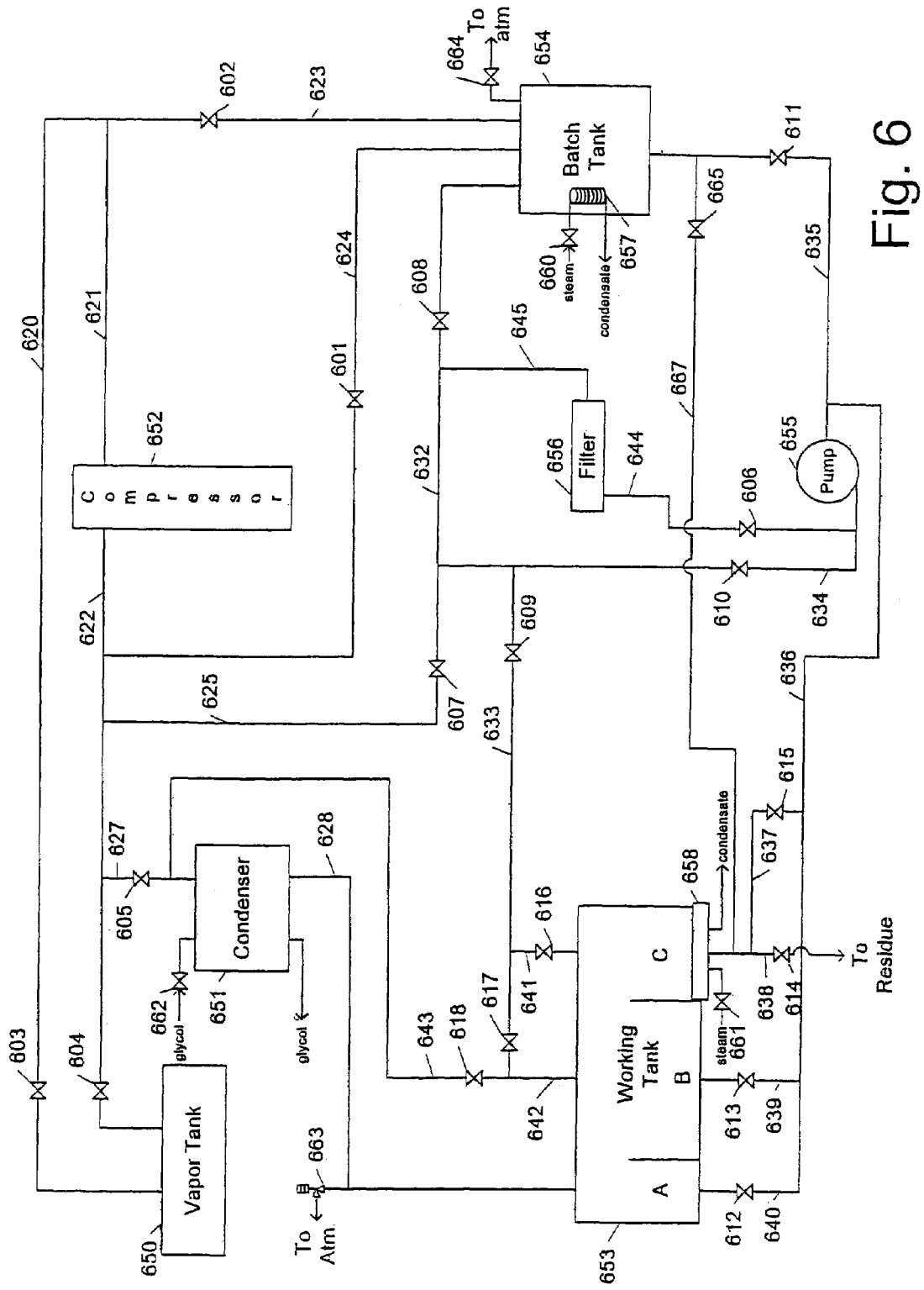
FIG. 6 is a schematic diagram illustrating embodiments of a batch processing system according to the present invention employing a carbon dioxide based solvent and having a divided working tank.

Referring now to FIG. 6, a embodiment of a batch processing system employing a liquid carbon dioxide solution and having a divided working tank will now be described. Valves 601–618 and 660–665 are shut, compressor 652 and pump 655 are secured, and batch tank 654 is pressurized with carbon dioxide vapor. As illustrated in FIG. 6, the batch processing system according to an embodiment of the present invention has a working tank 653. The working tank 653 is a divided pressure vessel, as described above in FIGS. 1–4, having three chambers A, B, and C. Various liquid transfer, re-circulation, and distillation operations will now be described followed by a description of various methods that utilize one or more of these operations. As used herein, the operations of draining, transferring, returning, or distilling a particular solution include draining, transferring, returning, or distilling all or just a portion of the solution, unless otherwise noted.

Liquid may be transferred from chamber C of the working tank 653 to the batch tank 654 by opening the valves 615, 610, 608, 601, and 605, and starting the pump 655 such that the liquid is transferred through the lines 637, 636, 634, and 632. Once a desired amount of liquid has been transferred to the batch tank 654, the pump 655 may be secured and the valves 615, 610, 608, 601, and 605 may be shut. Liquid may be transferred from the batch tank 654 to chamber C of the working tank 653 by opening the valves 611, 610, 609, 616, 601, and 605, and starting the pump 655 such that liquid is transferred through the lines 635, 634, 633, and 641. Once the desired amount of liquid has been drained from the batch tank 654, the pump 655 may be secured, and the valves 611, 610, 609, 616, 601, and 605 may be shut. Alternatively, liquid may be transferred from the batch tank 654 to chamber C of the working tank 653 by opening the valve 665 and gravity draining liquid from the batch tank 654 to chamber C. It may be desirable to gravity drain solution from the batch tank 654 to chamber C to avoid "contaminating" the pump flow path (lines 633–635, etc.) with the solution in the batch tank 654. For example, the solution in the batch tank 654 may be a wash solution that contains one or more aggressive cleaning adjuncts, which work well on cotton fabrics but may harm more delicate fabrics. Gravity draining the wash solution containing aggressive cleaning adjuncts to the working tank may reduce the likelihood that the aggressive cleaning adjuncts "contaminate" the remainder of the system. The aggressive cleaning adjuncts may then be removed from the system by distilling the liquid in chamber C.

Liquid in chamber C may be distilled by bringing a heating element 658 and a condenser 651 on-line as follows. The valves 618, 661, and 662 may be opened. The heating element 658 causes the liquid in chamber C to boil or vaporize. Carbon dioxide vapor is transferred through lines 642 and 643 to the condenser 651 where the vapor condenses to form liquid carbon dioxide. The liquid carbon dioxide flows from the condenser 651 through the line 628 into chamber A of the working tank 653. When the distillation operation is complete, the valves 662, 661, and 618 may be shut. The distillate bottoms remaining in chamber C may be purged from the system by opening the valve 614 and draining chamber C to a residue container.

Liquid may be circulated through the batch tank 654 and the filter 656 by opening the valves 611, 606, and 608, and starting the pump 655. The filter 656 may include a lint filter and/or a carbon filter. The filter 656 preferably is a combination lint filter and carbon filter configured such that the lint and carbon filters may be operated separately or may be operated together.

Liquid may be transferred from chamber B of the working tank 653 to the batch tank 654 by opening the valves 613, 610, 608, 601, and 605, and starting the pump 655 such that liquid is transferred through the lines 639, 636, 634, and 632. Once a desired amount of liquid has been transferred, the pump 655 may be secured and the valves 613, 610, 608, 601, and 605 may be shut. Liquid may be transferred from the batch tank 654 to chamber B of the working tank 653 by opening the valves 611, 610, 609, 617, 601, and 605, and starting the pump 655. Once the desired amount of liquid is drained from the batch tank 654, the pump 655 may be secured, and the valves 611, 610, 609, 617, 601, and 605 may be shut.

Liquid in chamber A of the working tank 653 may be transferred to the batch tank 654 by opening the valves 612, 610, 608, 601, and 605, and starting the pump 655 such that liquid is transferred from chamber A to the batch tank 654 through the lines 640, 636, 634, and 632. Once a desired amount of liquid is transferred to the batch tank 654, the pump 655 may be secured, and the valves 612, 610, 608, 601, and 605 may be shut.

Liquid may be transferred from one chamber of the working tank 653 to another chamber of the working tank 653 by opening the respective isolation valves. For example, liquid may be transferred from chamber B to chamber C by opening valves 613 and 615. Liquid levels in two chambers may be equilibrated by opening the respective isolation valves and allowing them to stay open for a sufficient amount of time, preferably 30 seconds.

The batch tank 654 may be depressurized by transferring carbon dioxide vapor from the batch tank 654 to the vapor tank 650 and/or venting carbon dioxide vapor to atmosphere. Processed articles or process products may then be removed from the batch tank 654.

In a first method of operation, the batch process is a cleaning process and the batch tank 654 is a wash tank containing articles to be cleaned. As used herein, the term "cleaning processes" includes various cleaning processes such as commercial dry cleaning processes, among others. Articles to be cleaned are preferably materials such as metal or plastic chip, virgin or recycled paper, glass, microelectronic components, silicon wafers throughout semiconductor (e.g., photolithography) processes, microelectro-mechanical devices (MEMS), fiber-optic devices and components, magnetic storage media, xerography components, metal and/or plastic parts or tools, tubing, pipe, medical devices such as stoppers/scalpels/syringes, medical implants, films such as photography/X-ray/protective films, filter media, slurries, particles, food products, seeds, gels, aerogels, expanded polytetrafluoroethylene (PTFE), open-cell and closed-cell foams, clean-room tools and components, rubber articles and components such as seals (e.g., gaskets and orings), packaging for "clean devices" such as microelectronic and medical devices, medical components and foodstuffs, among others. Articles to be dry cleaned (i.e., dry-cleanable articles) are preferably garments, uniforms, protective wear such as fire suits and radioactive protection suits, gloves, blankets and other linen, furs, feathers, structural textiles such as awnings, tents, etc. insulating suits, and sleeping bags, among others. Chamber A contains a solution consisting essentially of liquid carbon dioxide, chamber B contains a wash solution, and chamber C is empty. The wash solution preferably comprises greater than 50% liquid carbon dioxide and a cleaning adjunct. The wash solution preferably comprises between about 0.1, 1, or 5 and about 15, 25, or 49% by volume of the first cleaning adjunct. As will be understood by those skilled in the art, various cleaning adjuncts may be useful in the present invention including, but not limited to, those described in U.S. Pat. No. 5,858,022 to Romack et al., U.S. Pat. No. 6,001,133 to DeYoung et al., and co-pending and co-assigned U.S. patent application Ser. No. 09/313,748 to Romack et al. entitled *Combination Surfactant Systems for Use in Carbon Dioxide-Based Cleaning Formulations*, the disclosures of which are hereby incorporated herein in their entireties.

A first volume of the wash solution may be transferred from chamber B to chamber C by opening valves 613 and 615. Preferably, valves 613 and 615 remain open until liquid levels in chambers B and C are equilibrated, and are then shut.

The first volume of wash solution may be used as a pre-wash solution. If used as a pre-wash solution, the first volume of wash solution is preferably transferred from chamber C to the wash tank 654. If desired, a pre-wash adjunct may be added to the first volume of wash solution before, during, or after transferring the first volume of wash solution from chamber C to the wash tank 654. The pre-wash adjunct is preferably added to the first volume of wash solution while transferring the first volume of wash solution from chamber C to the wash tank 654. The pre-wash solution preferably comprises between about 0.1, 1, or 5 and about 15, 25, or 49% by volume of the pre-wash cleaning adjunct. As will be understood by those skilled in the art, various pre-wash cleaning adjuncts may be useful in the present invention including, but not limited to, the cleaning adjuncts described above. Thus, the pre-wash cleaning adjunct and the cleaning adjunct may be the same or may be different.

After contacting the articles to be cleaned in the wash tank with the pre-wash solution, at least a portion of the pre-wash solution may be returned from the wash tank 654 to the divided working tank 653. Preferably, all of the pre-wash solution is returned to the divided working tank 653. The pre-wash solution may be returned to chamber A, chamber B, or chamber C, or portions of the pre-wash solution may be returned to two or more of these chambers. The pre-wash solution is preferably returned to chamber B or chamber C. More preferably, the pre-wash solution is returned to chamber C, where it is distilled. The distillation operation may be performed during at least one of the operations of transferring wash solution from chamber B to the wash tank 654, washing the articles to be cleaned, returning the wash solution from the wash tank 654 to the divided working tank 653, transferring the rinse solution or the coating solution from chamber C to the wash tank, rinsing or coating the articles, and returning the rinse or coating solution from the wash tank 654 to the divided working tank 653.

A large amount (e.g., greater than 50%) of soils including particulates may be removed from soiled articles within the first few minutes of pre-washing or washing.

Pre-washing may remove these soils with a smaller amount of treating solution than washing would use. Additionally, pre-washing may remove the heavy soils before the washing operation and thereby improve cleaning effectiveness. After the pre-wash solution is returned from the wash tank 654 to the divided working tank 653, the wash solution may be transferred from chamber B to the wash tank 654, and the articles to be cleaned may be contacted with the wash solution.

Alternatively, the first volume of wash solution can be held in chamber C and the wash solution in chamber B can be transferred from chamber C to the wash tank 654. A second volume of wash solution can then be transferred from chamber C to chamber B by opening valves 613 and 615. Preferably, the second volume of wash solution is transferred from chamber C to chamber B so that a third volume of wash solution remains in chamber C. More preferably, the liquid levels in chamber B and chamber C are equilibrated. The second volume of wash solution is then transferred from chamber B to the wash tank, where the articles to be cleaned are contacted with the wash solution. The third volume of wash solution remaining in chamber C is preferably distilled in chamber C, and the resulting liquid carbon dioxide is preferably collected in chamber A. The distillation operation may be performed during various operations as described above with reference to distillation of the pre-wash solution.

The washing operation preferably includes circulating the wash solution through the wash tank 654 using the pump 655; however, the wash solution need not be circulated outside of the wash tank 654. After the article has been contacted with the wash solution for a sufficient amount of time, at least a portion of the wash solution is returned from the wash tank 654 to the divided working tank 653. Preferably, all of the wash solution is returned from the wash tank 654 to the divided working tank 653. The wash solution may be returned to chamber A, chamber B, or chamber C, or portions of the wash solution may be transferred to two or more of these chambers. Preferably, the wash solution is returned to chamber B or chamber C. More preferably, the wash solution is returned to chamber B.

The treating solution consisting essentially of liquid carbon dioxide in chamber A may be used as a rinse solution. The rinse solution may be transferred from chamber A to the wash tank 654 where the articles to be rinsed are contacted with the rinse solution. At least a portion of the rinse solution may be returned from the wash tank 654 to the divided working tank 653. Preferably, all of the rinse solution is returned from the wash tank 654 to the divided working tank 653. The rinse solution may be returned to chamber A, chamber B, or chamber C, or portions of the rinse solution may be returned to two or more of these chambers. Preferably, the rinse solution is returned to chamber B or chamber C. More preferably, the rinse solution is returned to chamber B.

The treating solution consisting essentially of liquid carbon dioxide in chamber A may also be used as a coating solution. The coating solution is transferred from chamber A to the wash tank 654. A coating adjunct may be added to the coating solution before, during, or after transferring the coating solution from chamber A to the wash tank 654. Preferably, the coating adjunct is added to the coating solution during or after transferring the coating solution from chamber A to the wash tank 654. More preferably, the coating adjunct is added to the coating solution while the coating solution is being transferred from chamber A to the wash tank 654. The coating solution preferably comprises between about 0.1, 1, or 5 and about 15, 25, or 49% by volume of the coating adjunct. The coating adjunct is preferably suspended in the liquid carbon dioxide by either dissolving or dispersing the coating adjunct into the liquid carbon dioxide. Coating adjuncts that may be used with the present invention include various adjuncts known to those skilled in the art as described above. At least a portion of the coating solution may be returned from the wash tank 654 to the divided working tank 653. Preferably, all of the coating solution is returned from the wash tank 654 to the divided working tank 653. The coating solution may be returned to chamber A, chamber B, or chamber C, or portions of the rinse solution may be returned to two or more of these chambers. Preferably, the coating solution is returned to chamber B or chamber C. More preferably, the rinse solution is returned to chamber C.

In another method of operation, the batch process is a purification and isolation process and the batch tank 654 is a purification and isolation tank. Chamber A may contain a first solution consisting essentially of liquid carbon dioxide, and preferably contains a solution that consists of liquid carbon dioxide. Chamber B may contain a second solution comprising a non-carbon dioxide solvent and a solute to be purified that is substantially insoluble in liquid carbon dioxide. The solute may be suspended (e.g., dissolved or dispersed) in the non-carbon dioxide solvent. The noncarbon dioxide solvent preferably has a higher boiling point than liquid carbon dioxide. Non-carbon dioxide solvents include, but are not limited to water aqueous mixtures (i.e. mixtures preferably comprising greater than 50% water) such as fermentation broth, extraction liquors, homogeneous polymerization mixtures, latexes, emulsions, and biological fluids such as blood, milk, and semen, hydrocarbons and petroleum fluids, halogenated solvents, HFCs, dimethyl sulfoxide (DMSO), terpenes, n-methylpyrrolidone (NMP), ethers, ketones, steam, fuel oils, crude oil, and other densified gases such as helium, nitrogen and air. Solutes to be purified that are substantially insoluble in liquid carbon dioxide include, but are not limited to, plastics, steroids, provitamins, heavy oils and greases, drugs, particulate, metals and metal complexes, cellulose and cellulose derivatives, proteins, amino acids and natural products.

The second solution comprising the non-carbon dioxide solvent and the solute is transferred from chamber B to the purification and isolation tank 654. The first solution consisting essentially of liquid carbon dioxide is transferred from chamber A to the purification and isolation tank 654. The operation of transferring the first solution from chamber A to the purification and isolation tank 654 may be performed before, after, or during the operation of transferring the second solution from chamber B to the purification and isolation tank 654. By combining the first solution with the second solution, at least a portion of the solute precipitates from the second solution.

A mixture comprising the first solution and the non-carbon dioxide solvent is drained from the purification and isolation tank 654. The mixture may further comprise solute, but preferably has a solute concentration of less than 100 ppm. The mixture may be transferred to chamber C where it may be distilled, with the liquid carbon dioxide directed to chamber A. After the distillation operation is complete, the non-carbon dioxide solvent may be drained from chamber C and recycled or discarded.

Figure 7:
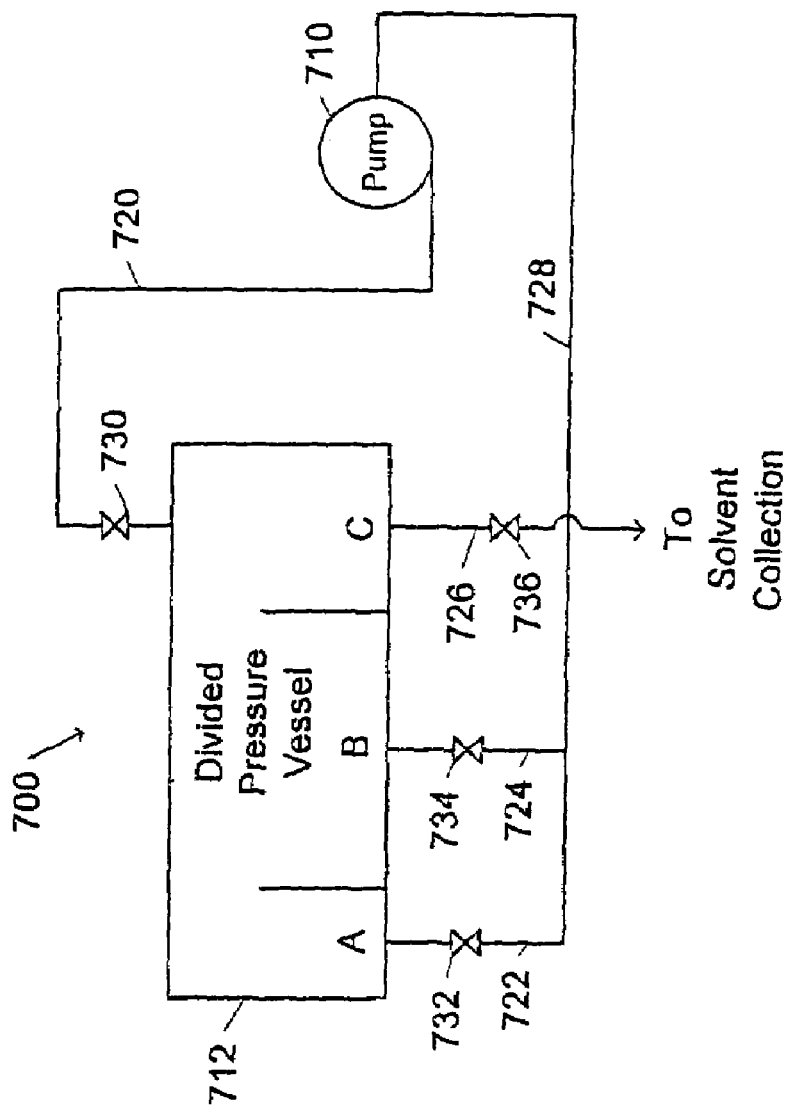
FIG. 7 is a schematic diagram illustrating embodiments of a purification and isolation system according to the present invention.

Referring now to FIG. 7, a processing system according to the present invention that is useful for purification and isolation will now be described. The purification and isolation system 700 has a pump 710 and a divided pressure vessel 712. The divided pressure vessel 712 has three chambers, A, B, and C, as described above with reference to FIGS. 1–4. Chamber C is used as the batch (purification and isolation) tank and is empty. Chamber A contains a first solution that consists essentially of liquid carbon dioxide. Chamber B contains a second solution comprising a non carbon-dioxide solvent and a solute that is substantially insoluble in liquid carbon dioxide. Alternatively, chamber C may contain the solute and chamber B may contain the non-carbon dioxide solvent.

The second solution in chamber B may be transferred to chamber C by opening the valves 734 and 730 and starting the pump 710 such that solution is transferred through the lines 724, 728 and 720. After the desired amount of second solution has been transferred, the pump 710 may be secured and the valves 734 and 730 may be shut. The solute may be suspended in the non-carbon dioxide solvent if it has not already done so. The first solution in chamber A may be transferred to chamber C by opening the valves 732 and 730 and starting the pump 710 such that solution is transferred through the lines 722, 728, and 720. Once a sufficient amount of liquid carbon dioxide is transferred to chamber C, the pump 710 may be secured and the valves 732 and 730 may be shut. By combining the first liquid and the second liquid, at least a portion of the solute will precipitate from the second solution. A mixture comprising non-carbon dioxide solvent and the first fluid may then be drained from chamber C by opening the valve 736. The mixture may further comprise solute, and preferably comprises less than 100 ppm solute. The precipitated solute may be removed from chamber C and isolated using various processes including, but not limited to, dilution, distillation, filtration, separation, compressed antisolvent, precipitation crystallization, depressurization, centrifugation, electrostatic isolation, deposition on a substrate, and GAS processes, just to name a few. Optionally, the solute may be rinsed after the draining operation but before the removing operation by opening the valves 732 and 730 and starting the pump 710 to transfer liquid carbon dioxide from chamber A into chamber C. The rinse solution may be drained from chamber C by opening the valve 736. The purification and isolation system according to the present invention illustrated in FIG. 7 may be used as part of a larger chemical process, in which case make-up liquid carbon dioxide may be provided into chamber A and a feed stream comprising non-carbon dioxide solvent and solute may be provided into chamber B.

Figure 8:
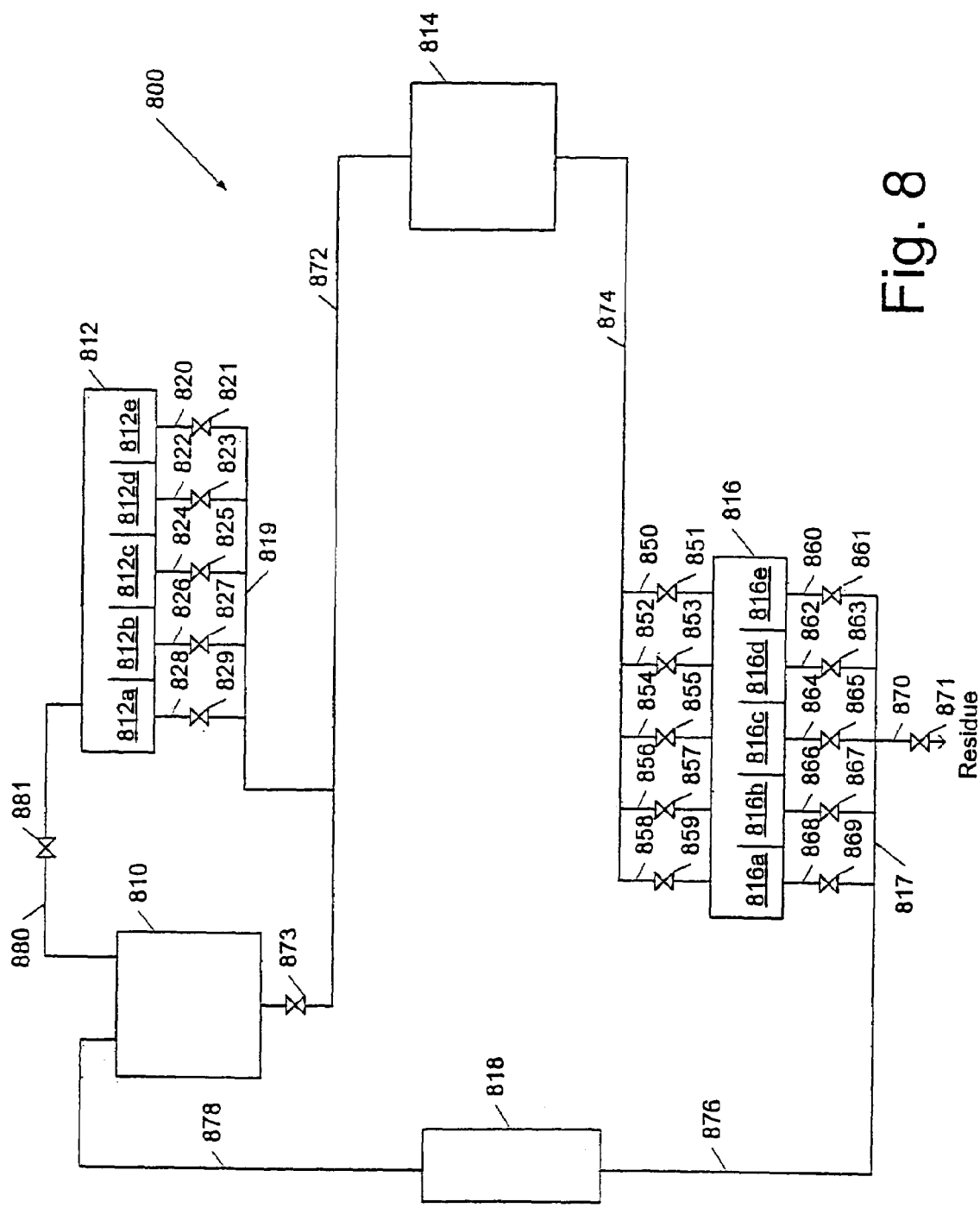
FIG. 8 is a schematic diagram illustrating embodiments of a batch processing system according to the present invention having a divided adjunct addition tank and a divided waste collection tank.

Referring now to FIG. 8, a processing system according to embodiments of the present invention having a divided adjunct addition vessel and a divided waste collection vessel will now be described. The processing system 800 includes a processing vessel 814. The processing vessel 814 may comprise various processing vessels as will be understood by those skilled in the art including, but not limited to, a cleaning vessel, an etching vessel, a photoresist developing vessel, a photoresist removing vessel and a chemical mechanical planarization (CMP) vessel. The processing vessel 814 may be configured to perform one or more of the functions of cleaning, etching, developing, photoresist removal and/or chemical mechanical planarization. The processing vessel 814 may be part of a cluster tool apparatus used in the fabrication of microelectronic devices.

The processing vessel 814 is in fluid communication with a liquid carbon dioxide storage tank 810 via line 872 and valve 873. The liquid carbon dioxide storage tank 810 preferably contains or is in communication with heating, cooling and/or pressurization systems capable of maintaining carbon dioxide in the liquid carbon dioxide storage tank 810 in the liquid state. The vapor space of the liquid carbon dioxide storage tank 810 is in fluid communication with the vapor space of the divided adjunct addition vessel 812 via line 880 and valve 881. Although not shown in the embodiments illustrated in FIG. 8, the liquid carbon dioxide storage tank 810 may be in fluid communication with one or more chambers of the divided adjunct addition vessel 812a–812e through one or more lines and valves between the liquid space of the liquid carbon dioxide storage tank 810 and the one or more chambers of the divided adjunct addition vessel 812. Fluid communication between the vapor space of the liquid carbon dioxide storage tank 810 and the divided adjunct addition vessel 812 may be provided to equalize the pressure between the liquid carbon dioxide storage tank 810 and the divided adjunct addition vessel 812 when an adjunct is introduced into the processing vessel 814 from the divided adjunct addition vessel 812 concurrently with an introduction of liquid carbon dioxide into the processing vessel 814 from the liquid carbon dioxide storage tank 810. While the embodiments of the processing system 800 illustrated in FIG. 8 show a line 880 and valve 881 providing fluid communication between the vapor space of the liquid carbon dioxide storage tank 810 and the divided adjunct addition vessel 812, it is to be understood that processing systems according to the present invention may not have a pressure equalization line. It is also to be understood that processing systems according to the present invention may include a pressurization system in fluid communication with the divided adjunct addition vessel 812 and capable of pressurizing the divided adjunct addition vessel 812 with, for example, liquid carbon dioxide, carbon dioxide vapor, or a combination of liquid and vapor.

The divided adjunct pressure vessel 812 has a first liquid chamber 812*a*, a second liquid chamber 812*b*, a third liquid chamber 812*c*, a fourth liquid chamber 812*d* and a fifth liquid chamber 812*e*. Different adjuncts may be stored in the various chambers of the divided adjunct pressure vessel 812. For example, when the processing vessel is configured to perform multiple processes in a microelectronic fabrication process, the first liquid chamber 812*a* may contain a photoresist developing adjunct, the second liquid chamber 812*b* may contain an etching adjunct, the third liquid chamber 812*c* may contain a photoresist removal adjunct, the fourth liquid chamber 812*d* may contain a CMP slurry adjunct, and the fifth liquid chamber 812*e* may contain a CMP cleaning adjunct.

The first liquid chamber 812*a* is in fluid communication with the processing vessel 814 via line 828, valve 829, header 819 and line 872. The second liquid chamber 812*b* is in fluid communication with the processing vessel 814 via line 826, valve 827, header 819 and line 872. The third liquid chamber 812*c* is in fluid communication with the processing vessel 814 via line 824, valve 825, header 819 and line 872. The fourth liquid chamber 812*d* is in fluid communication with the processing vessel 814 via line 822, valve 823, header 819 and line 872. Finally, the fifth liquid chamber 812*e* is in fluid communication with the processing vessel 814 via line 820, valve 821, header 819 and line 872. While the liquid chambers of the divided adjunct addition vessel 812 illustrated in FIG. 8 are in fluid communication with the processing vessel 814 via a common header 819, it is to be understood that one or more of the liquid chamber of divided adjunct addition vessels of the present invention may be in direct fluid communication (e.g., not via a common header) with the processing vessel. Direct fluid communication may be desirable, for example, when residual adjunct remaining in the header from a previous operation adversely impacts a subsequent operation employing a different adjunct. Although the header 819 as illustrated in FIG. 8 is in fluid communication with the line 872, it is to be understood that the header (or the lines from one or more of the chambers) may be in direct fluid communication with the processing vessel. Although the processing system 800 shown in FIG. 8 has one divided adjunct addition vessel 812, it is to be understood that processing systems of the present invention may have more than one divided adjunct addition vessels. While the processing system 800 illustrated in FIG. 8 shows a divided adjunct addition vessel 812 and a liquid carbon dioxide storage vessel 810, it is to be understood that processing systems according to the present invention may have a divided adjunct addition vessel and no liquid carbon dioxide storage vessel. In these embodiments, the fluids in the one or more chambers of the divided adjunct addition vessel are treating solutions that include liquid carbon dioxide and an adjunct. Although not shown in the embodiments illustrated in FIG. 8, it is to be understood that one or more pressure-building fluid transfer devices (e.g., pumps) may be present in the lines between divided adjunct addition vessel 812 and processing vessel 814 to overcome a pressure differential in transferring adjuncts to the processing vessel 814. One skilled in the art will understand how such pressure-building fluid transfer devices may be placed in one or more locations effectively.

The processing vessel 814 is in fluid communication with a divided waste collection vessel 816 via a line 874. The divided waste collection vessel 816 has a first liquid chamber 816*a*, a second liquid chamber 816*b*, a third liquid chamber 816*c*, a fourth liquid chamber 816*d*, and a fifth liquid chamber 816*e*. The first liquid chamber 816*a* is in fluid communication with the line 874 via line 858 and valve 859. The second liquid chamber 816*b* is in fluid communication with the line 874 via line 856 and valve 857. The third liquid chamber 816*c* is in fluid communication with the line 874 via line 854 and valve 855. The fourth liquid chamber 816*d* is in fluid communication with the line 874 via line 852 and valve 853. The fifth liquid chamber 816*e* is in fluid communication with the line 874 via line 850 and valve 851. While the divided waste collection vessel 816 and the divided adjunct addition vessel 812 as illustrated in FIG. 8 have the same number of liquid chambers, it is to be understood that divided waste collection vessels according to the present invention may have more or less chambers than the adjunct addition vessels. When the divided waste collection vessel 816 has fewer chambers than the divided adjunct addition vessel 812, it may be desirable to have a discharge line from line 874 to purification system 818 or to a residue receptacle via line 870 and valve 871. Although the processing system 800 shown in FIG. 8 has one divided waste collection vessel 816, it is to be understood that processing systems of the present invention may have more than one divided waste collection vessels.

The divided waste collection vessel 816 is in fluid communication with a purification system 818 via line 876. The purification system 818 may be various purification systems capable of purifying a treating solution in whole or in part as will be understood by those skilled in the art, including, but not limited to, distillation systems, filtration systems, separation systems, absorption systems, depressurization systems, centrifugation systems, or combinations thereof. The first liquid chamber 816*a* is in fluid communication with the purification system via line 868, valve 869, header 817, and line 876. The second liquid chamber 816*b* is in fluid communication with the purification system via line 866, valve 867, header 817, and line 876. The third liquid chamber 816*c* is in fluid communication with the purification system via line 864, valve 865, header 817, and line 876. The fourth liquid chamber 816*d* is in fluid communication with the purification system via line 862, valve 863, header 817, and line 876. The fifth liquid chamber 816*e* is in fluid communication with the purification system via line 860, valve 862, header 817, and line 876. Any of the various waste solutions collected in waste collection vessel 816 may also be discharged to a residue receptacle via line 870 and valve 871 rather than being recycled via the purification system 818. The purification system 818 is in fluid communication with the liquid carbon dioxide storage tank 810 via line 878.

While the processing system 800 as illustrated in FIG. 8 has a divided adjunct addition vessel 812 and a divided waste collection vessel 816, it is to be understood that processing systems according to the present invention may have a divided adjunct addition vessel and no divided waste collection vessel, or may have a divided waste collection vessel and no divided adjunct addition vessel. In other embodiments, the processing system may have a divided pressure vessel that serves as a divided adjunct addition vessel and a divided waste collection vessel.

When supercritical processing is desirable in processing vessel 814, the processing system 800 may include equipment such as a heat exchanger and/or a pressure-building device for changing the state of liquid carbon dioxide from liquid to supercritical, and may contain equipment such as a throttle valve and/or a heat exchanger for changing the state of the carbon dioxide from supercritical to liquid.

Various system configurations may be used as will be understood by those skilled in the art. For example, a heat exchanger and/or a pressure-building device may be provided in line 872, and a heat exchanger and/or throttle valve may be provided in line 874. As another example, the changes of state may be performed in the processing vessel 814. As yet another example, the changes of state may be performed in the divided adjunct addition vessel 812. The change of state from a supercritical fluid-based treating solution to a liquid densified gas-based treating solution may be may result in complete or partial purification of the treating solution such that the change of state operation is also a purification operation. Various methods according to embodiments of the present invention may be performed utilizing embodiments of the apparatus described with reference to FIG. 8. For example, a method of utilizing a divided storage vessel includes the operations of transferring a first treating adjunct from a first chamber in a divided storage vessel having a plurality of chambers that share a common vapor space to a processing vessel, transferring a densified fluid comprising a liquid densified gas or a supercritical fluid into the processing vessel, removing the first treating adjunct from the processing vessel, transferring a second treating adjunct having a composition different from the first treating adjunct from a second chamber in the divided storage vessel to the processing vessel, and removing the second treating adjunct from the processing vessel. While listed in a particular order, it is to be understood that these operations may be performed in various orders.

The operations of transferring a first treating adjunct from a first chamber in a divided storage vessel to a processing vessel, and transferring a densified fluid into the processing vessel may occur in various orders. For example, these operations may occur concurrently or one operation may occur before the other operation. The densified fluid may be a liquid densified gas, and the first treating adjunct and the densified fluid may be components of a first treating solution in the first chamber of the divided storage vessel. In this case, the operations of transferring a first treating adjunct from a first chamber in a divided storage vessel to a processing vessel, and transferring a densified fluid into the processing vessel may include the operation of transferring the first treating solution from the first chamber of the divided storage vessel to the processing vessel.

The operation of transferring a first treating adjunct from a first chamber in the divided storage vessel to a processing vessel may include pressurizing the divided storage vessel to a pressure higher than the pressure of the processing vessel, and establishing fluid communication between the first chamber in the divided storage vessel and the processing vessel. The operation of pressurizing the divided storage vessel to a pressure higher than the pressure of the processing vessel may include charging carbon dioxide gas and/or liquid or a non-carbon dioxide gas and/or liquid into the divided storage vessel. The operation of removing the first treating adjunct from the processing vessel may include removing the first treating adjunct and the densified fluid from the processing vessel. The method may further include the operation of transferring a densified fluid into the processing vessel after the operation of transferring a second treating adjunct from the second chamber in the divided storage vessel to the processing vessel.

Another method that may be performed according to embodiments of the present invention includes the operations of charging a first densified fluid comprising a liquid densified gas or a supercritical fluid into a processing vessel, removing the first densified fluid from the processing vessel, charging the first densified fluid into a first liquid chamber in a divided storage vessel having a plurality of liquid chambers that share a common vapor space, charging a second densified fluid comprising a liquid densified gas or a supercritical fluid into the processing vessel, removing the second densified fluid from the processing vessel, and charging the second densified fluid into a second liquid chamber in the divided storage vessel. When the first treating solution is a supercritical fluid based treating solution, the method further includes changing the state of the first treating solution from supercritical to densified gas prior to charging the first treating solution into the first liquid chamber of the divided storage vessel. When the second treating solution is a supercritical fluid based treating solution, the method further includes changing the state of the second treating solution from supercritical to densified gas prior charging the second treating solution into the second liquid chamber of the divided storage vessel The method may further include purifying at least one of the first densified fluid and the second densified fluid to provide substantially pure gas or densified fluid after removing the first and/or the second densified fluids to the divided storage vessel. The purifying operation may include transferring at least one of the first densified fluid and the second densified fluid from the divided storage vessel to a purification system, and purifying at least one of the first densified fluid and the second densified fluid to provide gas or densified fluid that is pure or substantially pure.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A dry cleaning method comprising the steps of:
   transferring a first densified gas based dry-cleaning solution from a first liquid chamber defined in a divided working tank to a wash tank containing a dry-cleanable article;
   contacting the dry-cleanable article with the first dry-cleaning solution;
   returning the first dry-cleaning solution from the wash tank to the divided working tank;
   transferring a second densified gas based dry-cleaning solution from a second liquid chamber defined in the divided working tank to the wash tank;
   contacting the dry-cleanable article with the second dry-cleaning solution; and returning the second dry-cleaning solution from the wash tank to the divided working tank;

wherein the first and second liquid chambers share a common vapor space.

2. The method according to claim 1, further comprising the step of storing the first and second dry-cleaning solutions as two-phase systems in the first and second liquid chambers and the common vapor space.

3. The method according to claim 1, wherein the first densified gas based dry-cleaning solution is a first carbon dioxide based dry-cleaning solution and the second densified gas based dry-cleaning solution is a second carbon dioxide based dry-cleaning solution.

4. The method according to claim 3, wherein the first densified gas based dry-cleaning solution is selected from the group consisting of a pre-wash solution, a wash solution, and a coating solution, and wherein the second densified gas based dry-cleaning solution is selected from the group consisting of a wash solution, a coating solution, and a rinse solution.

5. The method according to claim 3, wherein the step of returning the first carbon dioxide based dry-cleaning solution from the wash tank to the divided working tank comprises the step of returning the first carbon dioxide based dry-cleaning solution from the wash tank to the first chamber of the divided working tank.

6. The method according to claim 3, wherein the step of returning the second carbon dioxide based dry cleaning solution from the wash tank to the divided working tank comprises the step of returning the second carbon dioxide based dry cleaning solution from the wash tank to the second chamber of the divided working tank.

7. The method according to claim 6, further comprising the step of distilling the second carbon dioxide based dry cleaning solution in the second liquid chamber to form still bottoms and vapor consisting essentially of carbon dioxide.

8. A dry cleaning method comprising the steps of:
transferring a first densified gas based dry-cleaning solution from a first liquid chamber of a divided working tank to a wash tank containing a dry-cleanable article, wherein the first densified gas based dry-cleaning solution is a first carbon dioxide based dry-cleaning solution;

contacting the dry-cleanable article with the first carbon dioxide based dry-cleaning solution;

returning the first carbon dioxide based dry-cleaning solution from the wash tank to the divided working tank;

transferring a second densified gas based dry-cleaning solution from a second liquid chamber of the divided working tank to the wash tank, wherein the second densified gas based dry-cleaning solution is a second carbon dioxide based dry-cleaning solution;

contacting the dry-cleanable article with the second carbon dioxide based dry-cleaning solution;

returning the second carbon dioxide based dry-cleaning solution from the wash tank to the divided working tank; and transferring a first volume of the first carbon dioxide based dry-cleaning solution from the first liquid chamber to a third liquid chamber of the divided working tank, wherein the step of transferring the first volume from the first liquid chamber into a third liquid chamber precedes the step of transferring a first carbon dioxide based dry-cleaning solution from the first liquid chamber to the wash tank.

9. The method according to claim 8, wherein the step of transferring a first volume comprises equilibrating the liquid levels in the first liquid chamber and the third liquid chamber.

10. The method according to claim 8, further comprising the step of transferring a second volume of the first carbon dioxide based dry-cleaning solution from the third liquid chamber into the first liquid chamber after transferring a first carbon dioxide based dry-cleaning solution from the first liquid chamber to the wash tank, such that a third volume of the first carbon dioxide based dry-cleaning solution remains in the third liquid chamber.

11. The method according to claim 10, wherein the step of transferring a second volume comprises equilibrating the liquid levels in the first liquid chamber and the third liquid chamber.

12. The method according to claim 10, further comprising the step of transferring the second volume of the first carbon dioxide based dry-cleaning solution from the first liquid chamber to the wash tank.

13. The method according to claim 12, further comprising the step of distilling the third volume of the first carbon dioxide based dry-cleaning solution in the third liquid chamber.

14. The method according to claim 13, wherein the distilling step comprises the steps of:
boiling the third volume of the first carbon dioxide based dry-cleaning solution in the third liquid chamber to form still bottoms and vapor, the vapor consisting essentially of carbon dioxide;

condensing the vapor from the third liquid chamber to form a liquid consisting essentially of liquid carbon dioxide;

collecting the liquid carbon dioxide in the second liquid chamber; and purging the still bottoms from the third liquid chamber.

15. The method according to claim 14, wherein the step of returning the first carbon dioxide based dry-cleaning solution from the wash tank to the divided working tank comprises the step of returning the first carbon dioxide based dry-cleaning solution from the wash tank to the first liquid chamber.

16. The method according to claim 15, wherein the step of returning the second carbon dioxide based dry-cleaning solution from the wash tank to the divided working tank comprises the step of returning the second carbon dioxide based dry-cleaning solution from the wash tank to the first liquid chamber.

17. The method according to claim 15, wherein the step of returning the second carbon dioxide based dry-cleaning solution from the wash tank to the divided working tank comprises the step of returning the second carbon dioxide based dry-cleaning solution from the wash tank to the third liquid chamber, the method further comprising the steps of:
adding a coating adjunct to the second carbon dioxide based dry-cleaning solution during or after the step of transferring the second carbon dioxide based dry-cleaning solution from the second liquid chamber to the wash tank; and distilling the second carbon dioxide based dry-cleaning solution in the third chamber.

18. The method according to claim 8, further comprising the step of transferring the first volume of the first carbon dioxide based dry-cleaning solution from the third liquid chamber to the wash tank before transferring a first carbon dioxide based dry-cleaning solution from the first liquid chamber to the wash tank.

19. The method according to claim 18, further comprising the step of adding a pre-wash adjunct to the first volume of the first carbon dioxide based dry-cleaning solution.

20. The method according to claim 18, further comprising the steps of:
contacting the article with the first volume of the first carbon dioxide based dry-cleaning solution; and
returning the first volume of the first carbon dioxide based dry-cleaning solution from the wash tank to the third liquid chamber of the divided working tank before transferring a first carbon dioxide based dry-cleaning solution from the first liquid chamber to the wash tank.

21. The method according to claim 20, further comprising the step of distilling the first volume of the first carbon dioxide based dry-cleaning solution in the third liquid chamber after returning the first volume of the first carbon dioxide based dry-cleaning solution from the wash tank to the third liquid chamber.

22. The method according to claim 21, wherein the distilling step occurs during at least one of the steps of transferring a first carbon dioxide based dry-cleaning solution from the first liquid chamber to the wash tank, contacting the article in the wash tank with the first carbon dioxide based dry-cleaning solution, returning the first carbon dioxide based dry-cleaning solution from the wash tank to the divided working tank, transferring a second carbon dioxide based dry-cleaning solution from the second liquid chamber to the wash tank, contacting the article in the wash tank with the second carbon dioxide based dry-cleaning solution, or returning the second carbon dioxide based dry-cleaning solution from the wash tank to the divided working tank.

23. The method according to claim 22, wherein the step of returning the second carbon dioxide based dry-cleaning solution from the wash tank to the divided working tank comprises the step of returning the second carbon dioxide based dry-cleaning solution from the wash tank to the first liquid chamber.

24. A cleaning method comprising the steps of:
transferring a first densified gas based treating solution from a first liquid chamber defined in a divided working tank to a wash tank containing an article;
contacting the article with the first treating solution;
returning the first treating solution from the wash tank to the divided working tank;
transferring a second densified gas based treating solution from a second liquid chamber defined in the divided working tank to the wash tank;
contacting the article with the second treating solution; and
returning the second treating solution from the wash tank to the divided working tank;
wherein the first and second liquid chambers share a common vapor space.

25. The method according to claim 24, further comprising the step of storing the first and second treating solutions as two-phase systems in the first and second liquid chambers and the common vapor space.

26. The method according to claim 24, wherein the method is a dry cleaning method and wherein the article is a garment.

27. The method according to claim 24, wherein the article is a hard substrate.

28. The method according to claim 27, wherein the hard substrate is a microelectronic device.

29. The method according to claim 1 wherein the common vapor space is defined within the divided working tank.

30. The method according to claim 24 wherein the common vapor space is defined within the divided working tank.

* * * * *

UNITED STATES PATENT AND TRADEMARK OFFICE
CERTIFICATE OF CORRECTION

PATENT NO. : 6,982,007 B2
APPLICATION NO. : 10/695544
DATED : January 3, 2007
INVENTOR(S) : Worm et al.

It is certified that error appears in the above-identified patent and that said Letters Patent is hereby corrected as shown below:

on the title page item
(22), Filed: "October 29, 2003" should be -- Oct. 28, 2003 --.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO.        : 6,982,007 B2
APPLICATION NO.   : 10/695544
DATED             : January 3, 2006
INVENTOR(S)       : Worm et al.

It is certified that error appears in the above-identified patent and that said Letters Patent is hereby corrected as shown below:

on the title page item
(22), Filed:            "October 29, 2003" should be -- Oct. 28, 2003 --.

This certificate supersedes Certificate of Correction issued September 5, 2006.

Signed and Sealed this

Seventh Day of November, 2006

JON W. DUDAS
*Director of the United States Patent and Trademark Office*